United States Patent
Loehr et al.

(10) Patent No.: US 10,033,488 B2
(45) Date of Patent: Jul. 24, 2018

(54) DYNAMIC SCHEDULING FOR HYBRID AUTOMATIC REPEAT REQUEST TRANSMISSION TIME INTERVAL BUNDLING IN A COMMUNICATION SYSTEM

(71) Applicant: Panasonic Intellectual Property Corporation of America, Torrance, CA (US)

(72) Inventors: Joachim Loehr, Darmstadt (DE); Prateek Basu Mallick, Langen (DE); Alexander Golitschek Edler von Elbwart, Langen (DE); Michael Einhaus, Darmstadt (DE); Hidetoshi Suzuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 177 days.

(21) Appl. No.: 14/905,752

(22) PCT Filed: Jul. 28, 2014

(86) PCT No.: PCT/EP2014/066153
§ 371 (c)(1),
(2) Date: Jan. 15, 2016

(87) PCT Pub. No.: WO2015/018680
PCT Pub. Date: Feb. 12, 2015

(65) Prior Publication Data
US 2016/0164643 A1    Jun. 9, 2016

(30) Foreign Application Priority Data

Aug. 8, 2013  (EP) .................................. 13179793

(51) Int. Cl.
*H04L 1/18*     (2006.01)
*H04W 72/12*   (2009.01)
(Continued)

(52) U.S. Cl.
CPC ............ *H04L 1/1861* (2013.01); *H04L 1/189* (2013.01); *H04L 1/1854* (2013.01);
(Continued)

(58) Field of Classification Search
CPC ........... H04W 72/042; H04W 72/0446; H04W 72/04; H04W 72/0413; H04W 72/0406;
(Continued)

(56) References Cited

U.S. PATENT DOCUMENTS

2005/0249120 A1*  11/2005  Heo ...................... H04L 1/0007
                                                              370/236
2010/0208677 A1*  8/2010  Ahn ................... H04W 72/1257
                                                              370/329
(Continued)

FOREIGN PATENT DOCUMENTS

EP    2 200 209 A1    6/2010
WO    2008156414 A2   12/2008
WO    2009131509 A1   10/2009

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Sai Aung
(74) *Attorney, Agent, or Firm* — Seed IP Law Group LLP

(57) ABSTRACT

The present invention relates to transmitting data on a shared communication channel in a communication system supporting multiple hybrid automatic repeat request processes
(Continued)

and configurable to apply a bundling of transmission time intervals. The data transmitting including mapping of TTIs of the HARQ processes cyclically onto subframes. In order to efficiently support dynamic bundle scheduling, when a grant is received during a bundle transmission, this grant becomes a shifting grant, according to which the bundle is transmitted and according to the location of which the timing of the grant reception and the data transmission is adapted. The transmission of the shifted bundle is performed in accordance with the state of its retransmission process, i.e. the bundle is either initially transmitted or retransmitted.

15 Claims, 9 Drawing Sheets

(51) Int. Cl.
  *H04W 72/14* (2009.01)
  *H04L 1/00* (2006.01)
(52) U.S. Cl.
  CPC ....... *H04W 72/1289* (2013.01); *H04W 72/14* (2013.01); *H04L 1/0003* (2013.01); *H04L 1/0009* (2013.01)
(58) Field of Classification Search
  CPC ............. H04W 24/02; H04W 72/1289; H04W 76/048; H04W 52/0209; H04W 72/0453; H04L 1/1812; H04L 1/1887; H04L 5/0053; H04L 1/1896; H04L 5/0055; H04L 1/1854; H04L 5/0007; H04L 5/001; H04L 5/1469; H04L 1/1822; H04L 1/1825; H04L 1/1864
  See application file for complete search history.

(56) References Cited

U.S. PATENT DOCUMENTS

| 2011/0010598 | A1* | 1/2011 | Wang | H04L 1/1812 714/748 |
| 2011/0141991 | A1 | 6/2011 | Gao | |
| 2011/0205928 | A1* | 8/2011 | Pelletier | H04L 1/1883 370/252 |
| 2013/0250924 | A1* | 9/2013 | Chen | H04L 1/1819 370/336 |

OTHER PUBLICATIONS

3GPP TS 36.212 V10.4.0, "3rd Generation Partnership Project; Technical Specification Group Radio Access Network; Evolved Universal Terrestrial Radio Access (E-UTRA); Multiplexing and channel coding (Release 10)," Dec. 2011, 79 pages.
3GPP TS 36.213 V8.8.0 "3rd Generation Partnership Project; Technical Specification Group Radio Access Network; Evolved Universal Terrestrial Radio Access (E-UTRA); Physical layer procedures (Release 8)," Sep. 2009, 77 pages.
3GPP TS 36.213 V10.4.0 "3rd Generation Partnership Project; Technical Specification Group Radio Access Network; Evolved Universal Terrestrial Radio Access (E-UTRA); Physical layer procedures (Release 10)," Dec. 2011, 125 pages.
3GPP TS 36.213 V11.1.0 "3rd Generation Partnership Project; Technical Specification Group Radio Access Network; Evolved Universal Terrestrial Radio Access (E-UTRA); Physical layer procedures (Release 11)," Dec. 2012, 160 pages.
3GPP TS 36.300 V11.6.0 "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 11)," Jun. 2013, 209 pages.
3GPP TS 36.302 V10.3.0 "3rd Generation Partnership Project; Technical Specification Group Radio Access Network; Evolved Universal Terrestrial Radio Access (E-UTRA); Services provided by the physical layer (Release 10)," Dec. 2011, 19 pages.
3GPP TS 36,321 v12.8.0 "3rd Generation Partnership Project; Technical Specification Group Radio Access Network; Evolved Universal Terrestrial Radio Access (E-UTRA); Medium Access Control (MAC) protocol specification (Release 12)," Dec. 2015, 77 pages.
HTC Corporation, "NDI consideration for TTI bundling," R2-091424, 3GPP TSG-RAN WG2 #65, Agenda Item: 6.1.1.3, Feb. 9-13, 2009, Athens, Greek, 4 pages.
International Search Report dated Nov. 13, 2014, for corresponding International Application No. PCT/EP2014/066153, 3 pages.
Sesia et al., "LTE The UMTS Long Term Evolution—From Theory to Practice," Wiley, 2009, 21 pages.
Sunplus mMobile Inc., "Report of [64b: 10] email discussion on HARQ process for TTI Bundling," R2-091390, 3GPP TSG-RAN WG2 Meeting #65, Agenda Item: 6.1.1.3, Feb. 9-13, 2009, Athens, Greece, 11 pages.

* cited by examiner

DYNAMIC SCHEDULING FOR HYBRID AUTOMATIC REPEAT REQUEST TRANSMISSION TIME INTERVAL BUNDLING IN A COMMUNICATION SYSTEM

The present invention relates to transmission and reception of data in a shared data channel, using multiple automatic repeat request processes and bundling.

TECHNICAL BACKGROUND

Third generation (3G) mobile systems, such as, for instance, universal mobile telecommunication systems (UMTS) standardized within the third generation partnership project (3GPP) have been based on wideband code division multiple access (WCDMA) radio access technology. Today, 3G systems are being deployed on a broad scale all around the world. After enhancing this technology by introducing high-speed downlink packet access (HSDPA) and an enhanced uplink, also referred to as high-speed uplink packet access (HSUPA), the next major step in evolution of the UMTS standard has brought the combination of orthogonal frequency division multiplexing (OFDM) for the downlink and single carrier frequency division multiplexing access (SC-FDMA) for the uplink. This system has been named long term evolution (LTE) since it has been intended to cope with future technology evolutions.

The LTE system represents efficient packet based radio access and radio access networks that provide full IP-based functionalities with low latency and low cost. The downlink will support data modulation schemes QPSK, 16QAM, and 64QAM and the uplink will support QPSK, 16QAM, and at least for some devices also 64QAM, for physical data channel transmissions. The term "downlink" denotes direction from the network to the terminal. The term "uplink" denotes direction from the terminal to the network.

LTE's network access is to be extremely flexible, using a number of defined channel bandwidths between 1.4 and 20 MHz, contrasted with UMTS terrestrial radio access (UTRA) fixed 5 MHz channels. Spectral efficiency is increased by up to four-fold compared with UTRA, and improvements in architecture and signaling reduce round-trip latency. Multiple Input/Multiple Output (MIMO) antenna technology should enable 10 times as many users per cell as 3GPP's original WCDMA radio access technology. To suit as many frequency band allocation arrangements as possible, both paired (frequency division duplex FDD) and unpaired (time division duplex TDD) band operation is supported. LTE can co-exist with earlier 3GPP radio technologies, even in adjacent channels, and calls can be handed over to and from all 3GPP's previous radio access technologies.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. There are two data packet gateways located in the EPS for supporting the UE mobility—Serving Gateway (SGW) 130 and Packet Data Network Gateway 160 (PDN-GW or shortly PGW). Assuming the E-UTRAN access, the eNB entity 120 may be connected through wired lines to one or more SGWs via the 51-U interface ("U" stays for "user plane") and to the Mobility Management Entity 140 (MME) via the S1-MMME interface. The SGSN 150 and MME 140 are also referred to as serving core network (CN) nodes.

As shown above, the E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

FIG. 2 illustrates structure of a component carrier in LTE Release 8. The downlink component carrier of the 3GPP LTE Release 8 is sub-divided in the time-frequency domain in so-called sub-frames each of which is divided into two downlink slots, one of which is shown in FIG. 2 as 220 corresponding to a time period $T_{slot}$. The first downlink slot comprises a control channel region within the first OFDM symbol(s). Each sub-frame consists of a given number of OFDM symbols in the time domain, each OFDM symbol spanning over the entire bandwidth of the component carrier. In particular, the smallest unit of resources that can be assigned by a scheduler is a resource block also called physical resource block (PRB). A PRB 230 is defined as $N_{symb}^{DL}$ consecutive OFDM symbols in the time domain and $N_{sc}^{RB}$ consecutive sub-carriers in the frequency domain. In practice, the downlink resources are assigned in resource block pairs. A resource block pair consists of two resource blocks. It spans $N_{sc}^{RB}$ consecutive sub-carriers in the frequency domain and the entire $2 \cdot N_{symb}^{DL}$ modulation symbols of the sub-frame in the time domain. $N_{symb}^{DL}$ may be either 6 or 7 resulting in either 12 or 14 OFDM symbols in total. Consequently, a physical resource block 230 consists of $N_{symb}^{DL} \times N_{sc}^{RB}$ resource elements corresponding to one slot in the time domain and 180 kHz in the frequency domain (further details on the downlink resource grid can be found, for example, in 3GPP TS 36.211, "Evolved universal terrestrial radio access (E-UTRA); physical channels and modulations (Release 10)", version 10.4.0, 2012, Section 6.2, freely available at www.3gpp.org, which is incorporated herein by reference). While it can happen that some resource elements within a resource block or resource block pair are not used even though it has been scheduled, for simplicity of the used terminology still the whole resource block or resource block pair is assigned. Examples for resource elements that are actually not assigned by a scheduler include reference signals, broadcast signals, synchronization signals, and resource elements used for various control signal or channel transmissions.

The number of physical resource blocks $N_{RB}^{DL}$ in downlink depends on the downlink transmission bandwidth configured in the cell and is at present defined in LTE as being from the interval of 6 to 110 (P)RBs. It is common practice in LTE to denote the bandwidth either in units of Hz (e.g. 10

MHz) or in units of resource blocks, e.g. for the downlink case the cell bandwidth can equivalently expressed as e.g. 10 MHz or $N_{RB}^{DL}=50$ RB.

A channel resource may be defined as a "resource block" as exemplary illustrated in FIG. 3 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

The data are mapped onto physical resource blocks by means of pairs of virtual resource blocks. A pair of virtual resource blocks is mapped onto a pair of physical resource blocks. The following two types of virtual resource blocks are defined according to their mapping on the physical resource blocks in LTE downlink: Localised Virtual Resource Block (LVRB) and Distributed Virtual Resource Block (DVRB). In the localised transmission mode using the localised VRBs, the eNB has full control which and how many resource blocks are used, and should use this control usually to pick resource blocks that result in a large spectral efficiency. In most mobile communication systems, this results in adjacent physical resource blocks or multiple clusters of adjacent physical resource blocks for the transmission to a single user equipment, because the radio channel is coherent in the frequency domain, implying that if one physical resource block offers a large spectral efficiency, then it is very likely that an adjacent physical resource block offers a similarly large spectral efficiency. In the distributed transmission mode using the distributed VRBs, the physical resource blocks carrying data for the same UE are distributed across the frequency band in order to hit at least some physical resource blocks that offer a sufficiently large spectral efficiency, thereby obtaining frequency diversity.

In 3GPP LTE Release 8 the downlink control signalling is basically carried by the following three physical channels:
Physical control format indicator channel (PCFICH) for indicating the number of OFDM symbols used for control signalling in a sub-frame (i.e. the size of the control channel region);
Physical hybrid ARQ indicator channel (PHICH) for carrying the downlink ACK/NACK associated with uplink data transmission; and
Physical downlink control channel (PDCCH) for carrying downlink scheduling assignments and uplink scheduling assignments.

The PCFICH is sent from a known position within the control signalling region of a downlink sub-frame using a known pre-defined modulation and coding scheme. The user equipment decodes the PCFICH in order to obtain information about a size of the control signalling region in a sub-frame, for instance, the number of OFDM symbols. If the user equipment (UE) is unable to decode the PCFICH or if it obtains an erroneous PCFICH value, it will not be able to correctly decode the L1/L2 control signalling (PDCCH) comprised in the control signalling region, which may result in losing all resource assignments contained therein.

The PDCCH carries control information, such as, for instance, scheduling grants for allocating resources for downlink or uplink data transmission. The PDCCH for the user equipment is transmitted on the first of either one, two or three OFDM symbols according to PCFICH within a sub-frame.

Physical downlink shared channel (PDSCH) is used to transport user data. PDSCH is mapped to the remaining OFDM symbols within one sub-frame after PDCCH. The PDSCH resources allocated for one UE are in the units of resource block for each sub-frame.

Physical uplink shared channel (PUSCH) carries user data. Physical Uplink Control Channel (PUCCH) carries signalling in the uplink direction such as scheduling requests, HARQ positive and negative acknowledgements in response to data packets on PDSCH, and channel state information (CSI).

FIG. 3 schematically illustrates an example of mapping of data onto a physical channel in LTE. It is noted that this example is a simplified mapping for illustrational purposes only. User data (IP packets) may be generated by the user application. They may include speech, video, text, or any other media possibly compressed and encapsulated into other protocols before forming the IP packets. The IP packets are in EUTRAN further processed on the PDCP layer resulting in addition of a PDCP header. The PDCP packets formed in this manner are further segmented and/or reassembled (reassembling being shown in the figure) into RLC packets to which an RLC header is added. One or more RLC packets are then encapsulated into a MAC packet including also a MAC header and padding, if necessary. The MAC packet is also called "transport block". Thus, a transport block is from the point of view of the physical layer a packet of user data entering the physical layer. There are predefined transport block sizes (TBS) which may be used in LTE. The transport block is then within one transmission time interval (TTI) mapped onto the subframes on the physical layer (PHY). Details of the mapping of data starting with transport blocks up to the interleaving is shown in FIGS. 5.2.2-1 and 5.3.2-1 and described in the related description of the 3GPP TS 36.212, v.10.4.0, *"Evolved universal terrestrial radio access (E-UTRA); Multiplexing and channel coding"* available freely at www.3gpp.org and incorporated herein by reference, for the uplink and downlink transmission of user data respectively. Furthermore, the physical channel mapping is described in detail in FIGS. 6.3-1 and FIGS. 5.3-1 for downlink and uplink, respectively, and the related description in 3GPP TS 36.211, v10.4.0. An functional overview of uplink and downlink shared channel is furthermore given in sections 6.1.1 and 6.2.1 (respectively) of 3GPP TS 36.302, v10.3.0, *"Evolved Universal Terrestrial Radio Access (E-UTRA)*; Services provided by the physical layer".

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels. Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels. A multiplexing is then performed between logical channels and transport channels in the downlink and uplink respectively.

A possibility provided by the LTE in order to improve battery lifetime is the discontinuous transmission (DTX) and reception (DRX). In order to provide a reasonable battery consumption of the terminal (UE), LTE Rel-8/9 as well as Rel-10 provides a concept of discontinuous reception (DRX). Accordingly, the terminal does not have to regularly monitor the control channels but rather can switch off the transmission and the reception over long periods and needs to activate the transceiver only at predefined or required time instances.

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback (mentioned above) transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The uplink and downlink resource grants (grants enabling the UE to transmit data in downlink and uplink, respectively) are transmitted from the eNodeB to the UE in a downlink control information (DCI) via PDCCH. The downlink control information may be transmitted in different formats, depending on the signaling information necessary. In general, the DCI may include:
  a resource block assignment (RBA),
  modulation and coding scheme (MCS).

It may include further information, depending on the signaling information necessary, as also described in Section 9.3.2.3 of the book "*LTE: The UMTS Long Term Evolution from theory to practice*" by S. Sesia, I. Toufik, M. Baker, April 2009, John Wiley & Sons, ISBN 978-0-470-69716-0, which is incorporated herein by reference. For instance, the DCI may further include HARQ related information such as redundancy version (RV), HARQ process number, or new data indicator (NDI); MIMO related information such as pre-coding; power control related information, etc.

As described above, in order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can basically change from subframe to subframe. It should be noted that user allocation might also be performed on a TTI (Transmission Time Interval) basis, where the TTI length can be in general a multiple of the subframes or correspond to a subframe. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments (allocations) and other control information for a mobile terminal or groups of UEs. In general, several PDCCHs can be transmitted in one subframe. It should be noted that in 3GPP LTE, assignments for uplink data transmissions, also referred to as uplink scheduling grants or uplink resource assignments, are also transmitted on the PDCCH. Generally, the information sent on the L1/L2 control signaling for assigning uplink or downlink radio resources (particularly LTE(-A) Release 10) can be categorized to the following items:
  User identity, indicating the user that is allocated. This is typically included in the checksum by masking the CRC with the user identity. Then, the users (UEs) perform blind decoding by demasking the identities transmitted in the search space (i.e. in the resources configured as search space in which the respective terminals have to monitor the control information whether there is data for them).
  Resource allocation information, indicating the resources (Resource Blocks, RBs) on which a user is allocated. Note, that the number of RBs on which a user is allocated can thus be dynamic. In particular, the number of the resource blocks (frequency domain) is carried by the resource allocation information. The position in the time domain (subframe) is given by the subframe in which the PDCCH is received and a predefined rule (the resources are allocated fixed number of subframes after the PDCCH subframe)
  Carrier indicator, which is used if a control channel transmitted on a first carrier assigns resources that concern a second carrier, i.e. resources on a second carrier or resources related to a second carrier if carrier aggregation is applied.
  Modulation and coding scheme that determines the employed modulation scheme and coding rate (length of the transport block to be coded).
  HARQ information, such as a new data indicator (NDI) and/or a redundancy version (RV) that is particularly useful in retransmissions of data packets or parts thereof. In particular, new data indicator indicated whether the allocation is for an initial transmission of data or for a retransmission of data. Redundancy version indicates the coding applied to the retransmitted data (in LTE incremental redundancy combining is supported, meaning that each retransmission may include the data of the first transmission differently coded, i.e. may include parity bits which together with the already received transmission/retransmission(s) finally enable decoding).

Power control commands to adjust the transmit power of the assigned uplink data or control information transmission.

Reference signal information such as the applied cyclic shift and/or orthogonal cover code index, which are to be employed for transmission or reception of reference signals related to the assignment.

Uplink or downlink assignment index that is used to identify an order of assignments, which is particularly useful in TDD systems.

Hopping information, e.g. an indication whether and how to apply resource hopping in order to increase the frequency diversity.

CSI request, which is used to trigger the transmission of channel state information in an assigned resource.

Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference. For instance, DCI Format 0 is used for the transmission of resource grants for the PUSCH, using single-antenna port transmissions in uplink transmission mode 1 or 2.

In order for the UE to identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below. The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity. The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

The physical downlink control channel (PDCCH) carries e.g. scheduling grants for allocating resources for downlink or uplink data transmission. Multiple PDCCHs can be transmitted in a subframe. The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDCCH} = 2 \cdot N_{symb}^{DL} - N_{symb}^{PDCCH}$ OFDM symbols in the time domain on the IV subcarriers in the frequency domain is referred to as the PDSCH region or shared channel region (see below).

For a downlink grant (i.e. resource assignment) on the physical downlink shared channel (PDSCH), the PDCCH assigns a PDSCH resource for (user) data within the same subframe. The PDCCH control channel region within a subframe consists of a set of Control Channel Elements, CCEs where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate. Control channel elements are separately allocable units smaller than the entire physical resource block. They enable finer resource assignment for the control channel in which smaller amounts of data are transported.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH. Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference. In particular, Table 8-2 of TS 36.213 defines the parameter k for the TDD configurations 0-6, where k indicates the positive offset of the target of an uplink resource allocation received in a subframe; for TDD configuration 0 there is additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

The resource block assignment specifies the physical resource blocks which are to be used for the transmission in uplink or downlink.

The modulation and coding scheme defines the modulation scheme employed for the transmission such as QPSK, 16-QAM or 64-QAM. The lower the order of the modulation, the more robust is the transmission. Thus, 64-QAM is typically used when the channel conditions are good. The modulation and coding scheme also defines a code rate for a given modulation. The code rate is chosen depending on the radio link conditions: a lower code rate can be used in poor channel conditions and a higher code rate can be used in the case of good channel conditions. "Good" and "bad" here is used in terms of the signal to noise and interference ratio. The finer adaptation of the code rate is achieved by puncturing or repetition of the generic rate depending on the error correcting coder type.

For uplink resource assignments (for transmissions on the Physical Uplink Shared CHannel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively modulation and coding scheme (MCS) field has for example a size of bits, which corresponds to 32 entries. 3 TF/MCS table entries are reserved for indicating RVs 1, 2 or 3. The remaining MCS table entries are used to signal the MCS level (TBS) implicitly indicating RV0.

For details on the TBS/RV signaling for uplink assignments on PDCCH please see 3GPP TS 36.213, *"Evolved Universal Terrestrial Radio Access (E-UTRA); Physical layer procedures"*, version 3GPP TS 36.213, v.10.4.0, 2012 (available at http://www.3gpp.org and incorporated herein by reference). The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

In order to increase frequency diversity, LTE provides a possibility of hopping. Two hopping modes are supported, hopping only between subframes (inter-subframe hopping) and hopping both between and within subframes (inter- and intra-subframe hopping). In case of intra-subframe hopping, a frequency hop occurs at the slot boundary in the middle of the subframe. This provides frequency diversity within a codeword. Inter-subframe hopping provides frequency diversity between HARQ retransmissions of a transport block, as the frequency allocation hops every allocated subframe.

In order to increase the uplink coverage for power limited terminals or coverage scenarios, so-called TTI bundling has been introduced into Release 8 of LTE. The power limited terminals may be, for instance, the UEs present in the cell edge. A power-limited coverage scenario occurs, for instance, at the cell edge, where the signal received from the network (base station, eNB) is rather weak and the terminal has to increase its power and/or set a more robust modulation and coding scheme in order to enable the base station to receive its signal in the uplink. However, the possibility of increasing the transmission power is limited since it causes interference for other devices in this cell and possibly in the neighbor cells as well. Thus, the power limitation is mainly due to the limited interference to be generated. A further advantage of TTI bundling is also the reduction of overhead to avoid RLC segmentation.

FIG. 4 illustrates a TTI bundling mechanisms. The data to be transmitted are first coded 401. After the coding, the data is mapped onto four consecutive subframes 405, which are referred to as four bundled subframes or simply as a TTI bundle with a length of four subframes. For instance, in a power-limited scenario a single transport block from the MAC layer may be transmitted repeatedly in the four consecutive bundled subframes in order to increase the robustness of the transmission. The numbers indicated in the subframe-representing squares indicate the number of the HARQ process. The four subframes of the bundle belonging to the first process are denoted by 0000, the four subframes of the bundle belonging to the second process are denoted 1111, etc. Thus, in FIG. 4, four HARQ processes 0 to 3 are configured. For instance, the configuration of the number of processes in LTE is always 8 in the uplink per serving cell if no TTI-bundling is applied. If TTI-bundling is applied, there are 4 HARQ processes.

During the TTI bundling, the efficiency of signaling is increased by providing only one set of control signaling for the transmission of the entire bundle. For instance, the terminal will only receive PDCCH uplink grants once per entire bundle. Moreover, within a bundle, HARQ retransmissions are non-adaptive and triggered without waiting for HARQ feedback from previous transmissions. This is illustrated in FIG. 4, in which within the bundle data transmitted in the first four subframes 405 an error was detected. Accordingly, a negative acknowledgement (NACK) is transmitted from the network to the terminal. After receiving the negative acknowledgement, the terminal retransmits the data of all four subframes 405 in a new bundle of TTIs within the subframes 415.

In general, dynamic scheduling of TTI, bundling may be supported, which means that a TTI bundle may be scheduled at any time by using the signaling channel PDCCH. For instance, the starting point for transmitting the TTI bundle may be defined by such signaling. In particular, the PDCCH includes an uplink grant for the bundle into a PDCCH which is transmitted in a certain subframe. A fixed pattern is defined or configured by higher layers, which specifies the number of subframes between the certain grant (i.e. the reception of the grant by the terminal) and the transmission of the bundle for which the grant was received. Such a fixed timing pattern enables reducing the signaling overhead since the grant does not need to explicitly specify the number of subframe in which the bundle is to be transmitted. Rather, the position of the grant in the time domain (in terms of subframe number) and the defined gap between the reception of grant and the transmission of data, enable to unambiguously determine the time point for the bundle transmission. Accordingly, for instance, the terminal always transmits a bundle of N subframes after M subframes from receiving the grant for the bundle. The parameter M is set according to the system parameters such as round-trip time and processing delay. According to 3GPP TS 36.213, v. 8.8.0 *"Physical layer procedures", September* 2009, in particular Section 8 (available freely at www.3gpp.orq and incorporated herein by reference), for FDD (Frequency Division Duplex) mode and subframe (TTI) bundling operation, the UE will upon detection of a PDCCH with DCI format 0 in subframe n intended for the UE, and/or a PHICH transmission in subframe n−5 intended for the UE, adjust the corresponding first PUSCH transmission in the bundle in subframe n+4 according to the PDCCH and PHICH information. Thus, the timing in the Rel-8 LTE is fixed, i.e. for TTI Bundling operation, the data is transmitted from the terminal to the network 4 subframes after receiving a grant and 9 subframes after negative acknowledgement (in PHICH).

Apart from a possible fixed pattern (timing) between the reception of a grant and the transmission of the bundle data, the timing pattern may also be specified for the events of the retransmission protocol. For instance, the transmission of acknowledgement (positive or negative) may also be timed fixedly with respect to receiving of the grant and/or transmitting the data. Similarly, the data retransmission may be timed fixedly with respect to receiving of the feedback (acknowledgement) and/or the data transmission and/or the grant reception. In the LTE as currently defined, the fixed grant and HARQ process timing is specified for the downlink and uplink shared channel.

However, the application of TTI bundling also raises some problems connected with the specification of the terminal behavior at various possible network behaviors and configurations. Currently, within the standardization, dynamic scheduling of TTI bundling has been agreed in order to support scheduling flexibility and efficient system resource utilization. A flexible scheduling opportunity and efficient resource utilization are required to enhance the system capacity, especially when considering a high volume of UEs and Voice over IP services. The current standard does not specify the terminal behavior for the case when an uplink grant is indicated, which may cause different TTI HARQ processes/bundles to collide. Two TTI bundles collide when their (re)transmission times at least partially overlap. This may be an overlap of (re)transmissions of two active HARQ processes or an overlap between one active process (i.e. HARQ buffer for the process is non-empty and data is transmitted) and one non-active process (which does not transmit the bundle on a particular occasion).

Accordingly, it is possible that some terminals will always ignore "shifting" PDCCH (and make the original/previous HARQ Process PUSCH transmission) in case different TTI bundles collide. However, the UE behavior may be implemented in any way deciding to follow or not to follow the "shifting" PDCCH received and causing TTI bundle collision. This may lead to misinterpretation of received PDCCH and de-synchronization of the timing between the terminal and the network. Since the network may not know the UE implementation i.e. whether or not the UE would shift the PUSCH transmissions of process X on to the extended TTIs (starting overlapping TTIs with the next HARQ process) inside Process X+1, the decoding at the network side may subsequently fail. This may even lead the UE to exceed the maximum allowed re-transmissions allowed for any process, maxHARQ-Tx, leading to radio link failure and/or reset/re-establishment of protocol entities.

SUMMARY OF THE INVENTION

In view of the above problem, the aim of the present invention is to provide a terminal behaviour which would enable an efficient dynamic TTI-bundle scheduling for multiple HARQ processes.

This is achieved by the features as set forth in the independent claims.

Preferred embodiments of the present invention are the subject matter of the dependent claims.

It is the particular approach of the present invention to enable the dynamic TTI-bundle scheduling in such a manner that if a grant is received out of a generic timing corresponding to first subframes in respective TTI bundles, the timing of the data transmission is adapted accordingly and the transmission is performed in accordance with the current state of the bundle's HARQ process.

In accordance with an aspect of the present invention, a method is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle belonging to a same HARQ process, the data transmitting including mapping of TTIs of the HARQ processes cyclically onto subframes which are physical time-domain resources. The method comprises the following steps performed at a data transmitting node: receiving a grant to transmit a bundle of TTIs in an HARQ process; transmitting said entire bundle in said HARQ process in a subframe which is given by said grant if no further grant for the same bundle is received within a predetermined time period before the subframe given by said grant; and not transmitting said entire bundle if another grant for the same bundle is received within the predetermined time period.

It is noted that portion of the bundle may be transmitted until the later grant is received—still within the predetermined time period. However, the entire bundle is not transmitted, if the grant triggering its transmission is not a last grant within the predetermined time period. A grant triggers transmission of a TTI bundle. This may be achieved by defining a distance between the reception of the grant and the corresponding bundle transmission. Alternatively, the grant may carry the information about the location of the bundle transmission in the time domain (location of the subframe in which the bundle transmission starts).

Preferably, the TTIs of each bundle of N TTIs, N being an integer larger than 1, are mapped on respective consecutive subframes, one TTI onto one subframe. The predetermined time period may also be defined in terms of a number of subframes. Advantageously, the predetermined time period is equal to N subframes immediately before the 'original' PUSCH subframe given by the corresponding 'original' grant received for the bundle in the HARQ process. The 'original' here applies to the at-present timing of PDCCH and PUSCH without considering a shifting PDCCH that may be received after this 'original' grant but still inside the predetermined time period (shown as PDCCH-window in FIG. 6. Thus, the predetermined time period is advantageously equal to the number of subframes in the bundle i.e. the PDCCH-window size is same as the bundle size.

Said bundle in said HARQ process may be started to be transmitted at a subframe, the position of which is determined as: the Mth subframe from the position of the first grant received within the predetermined time period if a single grant was received within the predetermined time period; and the Mth subframe from the position of the last grant received within the predetermined time period if more than one grants were received within the predetermined time period, wherein M is an integer larger than 1.

Advantageously, M equals to N. This configuration results in a full timing raster given by the TTI-bundles of HARQ processes mapped cyclically and consecutively in a repeated fashion onto the subframes of the physical layer.

The method preferably further includes determining the position of the predetermined time period for another HARQ process according to the position of the subframe to which the transmission of said TTI bundle was shifted with respect to the position given by the first grant as a result of receiving within the predetermined time period the other, shifting, grant. In other words, the window (predetermined time period) for other processes is also shifted.

When a timing raster obtained by mapping the TTI-bundles of (active and inactive) HARQ processes cyclically and consecutively is considered, a grant may be expected regularly at the beginning of each TTI-bundle (every N-th subframe). If other than such a regular grant is received, still within in the predetermined time period, i.e. received during a TTI-bundle period (subframes), then such grant is called a shifting grant and will cause, according to an embodiment of the present invention, the shifting of the entire timing raster, i.e. times in which the grant reception is expected as well as the times for the bundle transmission.

The method advantageously further comprises the steps of storing for each HARQ process a process state including a new data indicator, NDI, of which the value indicates whether the next transmission shall be a first transmission of the entire bundle or a retransmission of the entire bundle, wherein the grant to transmit the bundle is received within control data further including an NDI value for the granted transmission; upon reception of the grant comparing the stored and the received NDI values; and based on a result of the comparing transmit new data in the bundle or retransmit the data from the last transmitted bundle of the same HARQ process.

Moreover, in order to increase the robustness against false grant detection, the method may further comprise the step of, upon receiving a grant, evaluating values of at least one of the following parameters for received within the control information carrying the grant based on a predefined rule and/or based on a value received with a previous grant and stored:

number of resource blocks for the subframe in which the TTI bundle is to be transmitted, wherein each subframe includes a plurality of physical resource blocks in frequency domain allocable, redundancy version indicating the type of coding of the TTI bundle to be retransmitted, or location of the control information carrying said grant within a search space.

In accordance with the evaluation the received grant is discarded or the bundle data is transmitted accordingly (according to the grant, i.e. in the subframe given by the grant).

In particular, the grant may be discarded if the number of resource blocks in the grand received differs from the last received grant (such as the first grant in the predetermined time period) and used otherwise; or when the redundancy version in the first grant and a further grant within the predetermined time period differs; or when the redundancy version of the present bundle to be transmitted does not follow the redundancy version of the last transmitted bundle in the redundancy version transmission scheme (the order of RV is predefined for the successive retransmissions); or when the location of the control information carrying the grant is same (or different, according to the applied rule) than the location for the control information carrying the grant for the last received (for instance the first in the predetermined time period) grant. The location may be given by the location of the control information in a particular search space (such as common search space or user search space) and/or by location within the search space, for instance, by the starting control channel element position.

Alternatively or in addition to the above configurations, the method further comprises the steps of: upon receiving a grant, determining whether, within the predetermined time period, control information having similar contents as the control information carrying said grant has been received; discarding said grant if no control information with similar contents as the control information carrying said grant has been received within the predetermined time period.

Moreover, the method advantageously further comprises the step of storing a transmission counter at a data transmitting node, wherein the transmission counter is increased for each retransmissions in a Bundle if the entire TTI bundle is transmitted and is not increased (or equivalently, the counter is subtracted/adjusted for each retransmissions in a Bundle when in implementation each retransmissions increased the counter but the bundle was not transmitted in its entirety due to the subsequent shifting PDCCH) if not the entire TTI bundle is transmitted i.e. partial Bundle (re)transmissions do not affect the transmission counter (either by not counting the (re)transmissions in a Bundle that is partially transmitted or by not counting the extending retransmissions of the said Bundle that overlaps onto the TTIs of next HARQ process). This transmission may be one of the HARQ state variables stored for each HARQ process separately. In an embodiment of the present invention within the 3GPP LTE, the counter may correspond to the state variable CURRENT_TX_NB.

Advantageously, the method further includes storing in a storage means a feedback state for each HARQ process at the data transmitting node, wherein the feedback state for each process is set to indicate reception of a positive acknowledgement if the entire bundle is transmitted after reception of the grant during a bundle transmission.

The method beneficially further comprises the step of determining a subframe position of the feedback information reception for said HARQ process and/or another HARQ process according to the position of the subframe to which the transmission of said TTI bundle was shifted with respect to the position given by the first grant as a result of receiving within the predetermined time period the other, shifting, grant, wherein the feedback information includes at least either a positive or a negative acknowledgement; and if in the determined subframe position a negative acknowledgement is received, determining a subframe position for retransmitting the entire bundle according to the determined subframe position of the feedback information.

The present invention is advantageously applicable to 3GPP LTE system. For instance, the data transmitting node may be the UE, the data receiving node the NodeB or relay, the shared data channel may be the PUSCH, and the grant may be received on PDCCH.

In accordance with an aspect of the present invention a method is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the method comprising the following steps performed at a data transmitting node: receiving a grant to transmit a bundle of TTIs in an HARQ process, the grant including a shift indicator indicating a number of subframes smaller than a predetermined time period which is smaller or equal to the number of TTIs per bundle; and transmitting said bundle in said HARQ process in a subframe which is given by said grant and the number of subframes indicated by the shift indicator.

Preferably, grants including the shift indicator are expected to be received only at predetermined timing given by the position of a first subframe within TTI bundles; and grants received at other timing are ignored.

According to an aspect of the present invention, a method is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the method comprising the following steps performed at a data receiving node: transmitting to a data transmitting node a grant to transmit a bundle of TTIs in an HARQ process, the grant including a shift indicator indicating a number of subframes smaller than a predetermined time period which is smaller or equal to the number of TTIs per bundle; and receiving said bundle in said HARQ process in a subframe which is given by said grant and the number of subframes indicated by the shift indicator. As part of this method, the UE ignores PDCCH (UL grant) that is scheduling a PUSCH not starting at the TTI boundary (i.e. 4 TTI raster) and the PDCCH content will indicate TTI shift (1, 2 or 3 subframes). A "shifting" PDCCH is distinguished from a regular PDCCH by introducing a new field in the DCI (TTI offset) or by specific codepoints of the current DCI formats, e.g. MCS 29/30/31 for 1/2/3 ms shift. Association of "shifting" PDCCH to HARQ process is unambigiously given by timing of PDCCH. Further, the HARQ protocol operation is continued across TTI bundle shifting as described in main idea.

Advantageously, the shift indicator is carried by: a separate field within the control information carrying the grant or some predefined codepoints of a modulation and coding scheme coding table which is further used to define codepoints for certain combinations of modulation and coding scheme. However, it is noted that the present invention is not limited thereto and that the shift indicator may be also jointly coded with another element or signaled within codepoints of another parameter.

According to an embodiment of the invention, the method includes at least one of the following steps:
when a bundle of a shifted HARQ process is transmitted upon reception of a grant during bundle transmission, shortening the number of TTIs per bundle of the shifted HARQ process and not shortening the number of TTIs per bundle of the remaining HARQ processes, or
when a bundle of a shifted HARQ process is transmitted upon reception of a grant during bundle transmission, shortening the number of TTIs per bundle of the process following the shifted HARQ process and not shortening the number of TTIs per bundle of the remaining HARQ processes, or
when a bundle of a shifted HARQ process is transmitted upon reception of a grant during bundle transmission, shortening the number of TTIs per bundle of the shifted HARQ process and not shortening the number of TTIs per bundle of the remaining HARQ processes if for the process following the shifted process a grant is received, and shortening the number of TTIs per bundle of the process following the shifted HARQ process and not shortening the number of TTIs per bundle of the remaining HARQ processes if for the process following the shifted process a grant is not received within the predetermined time period.

This embodiment results in squeezing one of the processes, i.e. reducing (than the usual TTI Bundle Size) the number of TTIs (subframes) per process which means that a fewer transmissions/RV (redundancy versions) would be made than usual. This results in reduction of data repetition in case in which each bundle carries repeated data in its TTIs, i.e. in case when the data in all TTIs of the bundle is identical. Also, which RVs can be used in the squeezed number of subframes could be based on predetermined rule (e.g. start from the RV0) or based on network's indication in the shifting PDCCH (that is the one with the shift indicator).

According to an aspect of the present invention, an apparatus is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs of the HARQ processes cyclically onto subframes which are physical time-domain resources, the apparatus comprising: a receiving unit for receiving a grant to transmit a bundle of TTIs in an HARQ process; a transmitting unit configured for transmitting said entire bundle in said HARQ process in a subframe which is given by said grant if no further grant for the same bundle is received within a predetermined time period before the subframe given by said grant; and not transmitting said entire bundle if another grant for the same bundle is received within the predetermined time period.

Advantageously, the TTIs of each bundle of N TTIs, N being an integer larger than 1, are mapped on respective consecutive subframes, one TTI onto one subframe; the predetermined time period is equal to N subframes before the subframe given by the first grant received for the bundle in the HARQ process; and the apparatus further includes a timing unit configured to determine the position of the predetermined time period for another HARQ process (or all remaining HARQ processes) according to the position of the subframe to which the transmission of said TTI bundle was shifted with respect to the position given by the first grant as a result of receiving within the predetermined time period the other, shifting, grant.

Moreover, the transmission unit may be configured to transmit said bundle in said HARQ process in a subframe, the position of which is determined as the Mth subframe from the position of the first grant received within the predetermined time period if a single grant was received within the predetermined time period; and the Mth subframe from the position of the last grant received within the predetermined time period if more than one grants were received within the predetermined time period, wherein M is an integer larger than 1. Advantageously, M equals to N.

Preferably, the apparatus further comprises a storage for storing for each HARQ process a process state including a new data indicator, NDI, of which the value indicates whether the next transmission shall be a first transmission of the entire bundle or a retransmission of the entire bundle. Accordingly, the receiving unit is configured to receive (expect) the grant to transmit the bundle within control data further including an NDI value for the granted transmission and the apparatus further includes a comparing unit for, upon reception of the grant, comparing the stored and the received NDI values, wherein the transmitting unit is further configured to, based on a result of the comparing unit, transmit new data in the bundle or retransmit the data from the last transmitted bundle of the same HARQ process.

Moreover, the apparatus may further comprise a false grant detecting unit configured for, upon receiving a grant, evaluating values of at least one of the following parameters for received within the control information carrying the grant based on a predefined rule and/or based on a value received with a previous grant and stored:
  number of resource blocks for the subframe in which the TTI bundle is to be transmitted, wherein each subframe includes a plurality of physical resource blocks in frequency domain allocable,
  redundancy version indicating the type of coding of the TTI bundle to be retransmitted, or
  location of the control information carrying said grant within a search space; and
in accordance with the evaluation performed by the false grant detecting unit, the transmitting unit is configured to discard the grant received or to transmit the bundle data accordingly.

Alternatively, or in addition, the false grant detecting unit may further be configured to, upon receiving a grant, determining whether, within the predetermined time period, control information having similar contents as the control information carrying said grant has been received. According to the result of the determination, the transmitting unit may be further capable of discarding said grant if no control information with similar contents as the control information carrying said grant has been received within the predetermined time period.

The apparatus advantageously further comprises a state variable storage for storing a transmission counter at a data transmitting node, wherein the transmission counter is increased if the entire TTI bundle is transmitted and is not increased if not the entire TTI bundle is transmitted.

Moreover, the apparatus may beneficially include a timing determination unit, which is configured to determine a subframe position of the feedback information reception for said HARQ process and/or another HARQ process according to the position of the subframe to which the transmission of said TTI bundle was shifted with respect to the position given by the first grant as a result of receiving within the predetermined time period the other, shifting, grant, wherein the feedback information includes at least either a positive or a negative acknowledgement; and if in the determined subframe position a negative acknowledgement is received, to determine a subframe position for retransmitting the entire bundle according to the determined subframe position of the feedback information.

According to an aspect of the present invention, an apparatus is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the apparatus comprising: a receiving unit configured for receiving a grant to transmit a bundle of TTIs in an HARQ process, the grant including a shift indicator indicating a number of subframes smaller than a predetermined time period which is smaller or equal to the number of TTIs per bundle; a transmitting unit configured for transmitting said bundle in said HARQ process in a subframe which is given by said grant and the number of subframes indicated by the shift indicator.

According to an aspect of the present invention, an apparatus is provided for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the apparatus comprising: a transmission unit for transmitting to a data transmitting node a grant to transmit a bundle of TTIs in an HARQ process, the grant including a shift indicator indicating a number of subframes smaller than a predetermined time period which is smaller or equal to the number of TTIs per bundle; a receiving unit for receiving said bundle in said HARQ process in a subframe which is given by said grant and the number of subframes indicated by the shift indicator.

According to an embodiment of the present invention, a system is provided including a data receiving node configured to transmit grants and receive data from a data transmitting node in the subframes given by the grants and the data transmitting node configured to receive the grants and transmit the data to the data receiving node. The data transmitting node and/or the data receiving node may be the apparatus(es) defined above.

In accordance with another aspect of the present invention, a computer program product comprising a computer-readable medium having a computer-readable program code embodied thereon is provided, the program code being adapted to carry out the present invention.

According to an aspect of the present invention the above apparatus is embodies on an integrated circuit.

The above objectives and other objectives and features of the present invention will become more apparent from the following description and preferred embodiments, given in conjunction with the accompanying drawings in which.

DETAILED DESCRIPTION

As already discussed in the background section above, the TTI bundling has been introduced into Release 8 of LTE in order to increase the uplink coverage for power limited terminals or scenarios. In particular, such a power limited scenario occurs, for instance, at the cell edge. An advantage of TTI bundling is also the reduction of overhead to avoidance of RLC segmentation.

One of the possibilities of defining the UE behavior is not to support dynamic scheduling of TTI bundling. Accordingly, the terminal declares any PDCCH carrying the uplink grant which is received during a TTI bundle transmission or retransmission as a false uplink grant and ignores it. A false UL grant is a grant which was not intended for the terminal (UE) which decoded (received) it. This may occur, for instance, when a terminal blindly decodes by using own RNTI a PDCCH and assumes falsely that it is intended for it (due to an incorrect detection/decoding).

It is noted that not all cases in which PDCCH is received and which would result into a TTI bundle collision can be, or are, due to an obviously falsely received PDCCH. The ignoring of any PDCCH received during a TTI-bundle transmission results in not adjusting the timing of the grant-data transmission and/or HARQ pattern. Thus, the starting time of a bundle is not changed, which limits the efficiency of the scheduling performed by e NodeB.

Another alternative in order to define the behavior of the terminal could be enabling the adaptation of the timing of TTI bundles in accordance with the received PDCCH. In such a case, it must be defined, which of the PDCCH uplink grants received during the TTI bundle would be taken as a basis for the later timing pattern. One possibility is configuring the timing of the TTI bundles in accordance with the latest received PDCCH for the bundle.

Figure 5:
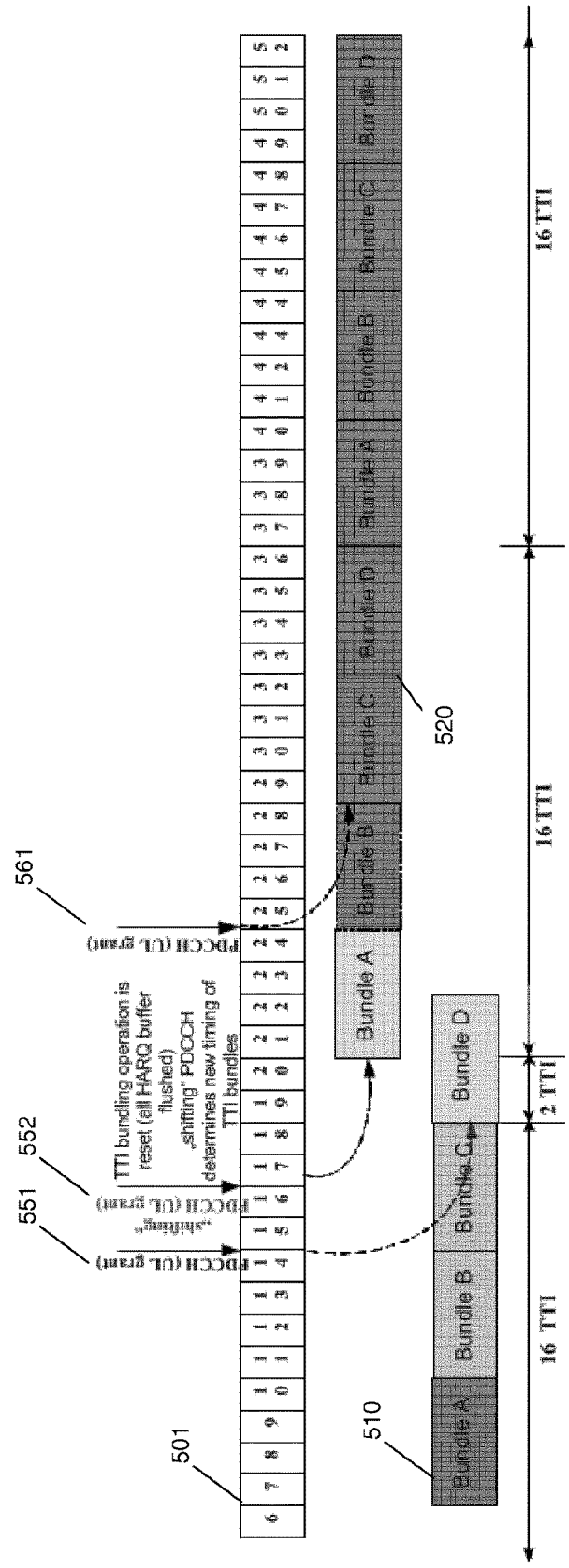
FIG. 5 is a schematic drawing illustrating reception of a grant during a TTI-bundle transmission and the resetting of the timing pattern for the configured HARQ processes.

FIG. 5 illustrates a mechanism, in which the UE always follows the latest PDCCH and adapts the timing of the TTI bundles accordingly. The line of subframes 501 staring with subframe 6 and ending with subframe 52 illustrates the physical layer timing in terms of subframe number. Mapping 510 illustrates the mapping of TTI bundles A, B, C and D corresponding to four processes A, B, C and D of an HARQ method, mapped onto the subframes starting with subframe 7 (cf. "bundle A"). Mapping 520 illustrates the mapping of the bundles corresponding to four processes after adaptation of the timing due to a received "shifting PDCCH" 552. In order to avoid collision of TTI bundles, the timing of the remaining HARQ processes is to be adapted whenever the new grant is received for the same bundle.

Here, the term "shifting PDCCH" for a process X means a PDCCH received within TTI Bundle Size subframes starting and including the TTI where the UL grant in PDCCH is generally received, corresponding to the first TTI of the previous HARQ process X−1. In different words, the term "shifting PDCCH" means a PDCCH received in another subframes than the first subframes of the respective process X before the bundle to which the PDCCH is related. In other words, the shifting PDCCH is a PDCCH which causes the timing of the grant reception and data transmission to change, i.e. which shifts the timing by a number of subframes K (integer) which is less than the bundle size N (K<N, K=1 . . . N−1). Even when in the description concerning particular examples, the term "shifting PDCCH" is employed, it is noted that the shifting is caused by the reception of the grant, which is carried (indicated) by the PDCCH, i.e. in general by the control information received. However, the control information (and also the PDCCH in LTE) may carry further parameters as described above such as MCS, RV, size of the resource block allocation, etc. Accordingly, also a term "shifting grant" is used to denote the reception of control information for triggering data transmission.

In the LTE (cf. 3GPP TS 36.321, Medium Access Control (MAC) Protocol Specification, v.8.12.0, March 2013, Section 5.4.2, available freely at www.3gpp.orq and incorporated herein by reference) Each HARQ process is associated with a HARQ buffer. Each HARQ process maintains a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. In the scenario mentioned above, the bundle of TTIs is made of N repeated MAC PDUs, N being the bundle size in terms of TTIs.

The sequence of redundancy versions is 0, 2, 3, 1. Another state variable CURRENT_IRV is an index into the sequence of redundancy versions. This variable is up-dated modulo 4. New transmissions are performed on the resource and with the MCS indicated on PDCCH. Adaptive retransmissions are performed on the resource and, if provided, with the MCS indicated on PDCCH. Non-adaptive retransmission is performed on the same resource and with the same MCS as was used for the last made transmission attempt. The UE is configured with a maximum number of HARQ transmissions by the RRC.

However, merely specifying that it is the latest PDCCH, according to which the timing is adapted, still does not define the way of adaptation and the terminal behavior unambiguously. Accordingly, a secure behavior of a terminal would be to flush the content of all uplink HARQ transmission buffers, which would mean resetting the TTI bundling operation and restarting with a new timing.

In particular, in FIG. 5, processes A, B, C and D are transmitted consecutively within a respective four bundles starting with respective subframes 7, 11, 14 and 19. However, in addition to the first PDCCH uplink grant 551, received in subframe 15, another PDCCH uplink grant 552 is received in subframe number 17. This second PDCCH uplink grant 552 will cause shifting of the entire timing of transmitted bundles and will therefore be called "shifting PDCCH" uplink grant in the following. FIG. 5 describes a case, in which the length of the bundle N is equal to four subframes. In general, N may be any integer larger than 1 (with value of one subframe per bundle there is no bundling). The timing pattern of the TTI bundles in this example is given by transmitting the TTI-bundle four subframes after receiving the corresponding uplink grant, i.e. M=4, N=4. In this scenario, after receiving the second grant 552, the TTI bundling operation is reset and restarted with the new timing. The new timing starts with the subframe 21 and with the HARQ process A (bundle A) followed by the cyclic mapping of the remaining retransmission processes with the same shifted timing in the respective subfames 25, 29, 33, 37, 41, 45 and 49.

However, the approach described with reference to FIG. 5 leads to an inefficient HARQ protocol operation upon receiving the shifting PDCCH uplink grant which causes shifting of the TTI bundling pattern. In particular, the flushing of the HARQ transmit buffers of all configured HARQ processes during the resetting of the TTI bundling operation leads to a loss of data which would have been transmitted in bundle D of mapping 510. This may result in different effects depending on the operation mode of the RLC entity. In particular, in case of RLC unacknowledged mode (UM) which is used, for instance, for Voice over IP services and other delay-sensitive services, the buffer flushing would result in packet dropping. Since unacknowledged mode does not provide any retransmission mechanism, this may, in turn, lead to a speech quality degradation. In the case of RLC acknowledged mode (AM), the loss of bundle D in the mapping 510 would lead to RLC retransmissions which, on the one hand, would avoid the packet dropping but, on the other hand, would slow down the transmission and cause delay which may also have a negative effect on the quality of the received signal.

In view of the above discussed problems with configuring the TTI bundling dynamically, according to the present invention, still the latest PDCCH is used for adapting the timing of the TTI bundling. However, the terminal associates the shifting grant with a particular HARQ process (TTI bundle) based on a predetermined rule.

The current state of each HARQ process is stored within the terminal including the information on whether the current transmission is a first transmission (initial transmission) of the bundle or a retransmission of the bundle. In accordance with this stored information, the TTI bundle is transmitted or retransmitted at a timing given by the received shifting PDCCH, i.e. signaling including grant for the transmission of the bundle. Then, the operation of the HARQ protocol for all following HARQ processes is continued across the event of shifting, and the hybrid ARQ buffer content is maintained for all HARQ processes without being flushed.

It is noted that the present invention is not limited to any version of LTE and also not to the LTE itself. Rather, it provides a method for transmitting data on any shared communication channel in a communication system supporting multiple hybrid automatic repeat request, HARQ, processes (such as stop and wait HARQ with multiple processes) and configurable to apply a bundling of transmission time intervals. The data transmission includes mapping of TTIs onto subframes. In such systems, in order to transmit data on a channel, the transmitting node (for instance a terminal) monitors a signaling channel for occurrence of a grant. In accordance with an embodiment of the present invention, the data transmitting node monitors the signaling channel during a predetermined period before transmitting a bundle of TTIs in an HARQ process. The monitored control signaling channel carries control information including a grant for transmitting the bundle. The signaling channel may be a common control channel, on which blind decoding is performed in order to identify whether the information is addressed to the transmitting node or to other nodes.

The predetermined time period may be predefined in the standard. For instance, it may be defined that the predetermined time period has a length of 4. Alternatively, the predetermined time period may be determined by the setting of the bundle size. For instance, it may be specified that the predetermined time period has always the same size in subframes as the number of subframes/TTIs in the bundle. The bundle size may be, in general, configurable. However, the present invention is not limited thereto and the predetermined time period may also be separately configurable, for instance by higher layer protocol such as RRC or in another way.

As soon as the predetermined time period expired, the terminal (or, in general a transmitting node, since the transmission may also be performed from the network to the terminal or between other two nodes) transmits the bundle in the HARQ process in a subframe, the location of which is given by the grant received as the specific (e.g. last) grant for the bundle within the predetermined period. Accordingly, the timing of the predetermined period and the HARQ processes is shifted. In particular, the shift size in subframes may be given by the difference between a start of TTI-bundle transmission according to the current timing and the reception of the shifting grant received during the TTI-bundle period.

In LTE, the regular PDCCH need not to occur every $4^{th}$ subframe (e.g. depending on PHICH); in case of a negative acknowledgement of data reception by the network (NACK), the UE may non-adaptively re-transmit the (entire) bundle if there was no PDCCH sent, in case of a positive acknowledgement of data reception (ACK), the network may (e.g. to change the PRBs) or may not (if it does not want the UE to make a transmission) send the PDCCH. The regular PDCCH need not occur every $4^{th}$ subframe but if it occurs then it occurs, according to current state of standardization, on $4^{th}$ subframes (e.g. 0, 4, 8, etc.). The present invention relates to the case when the PDCCH does not occur on $4^{th}$ subframes but occurs on other subframes e.g. 1, 2, 3, 5, 6 etc. in order to increase the flexibility of the scheduling. It is noted that even when the current LTE specification only support for the TTI bundling the bundle of 4 subframes (TTIs), in general, the present invention can also be used for other bundling sizes. Then, correspondingly, the timing raster for control information would also be adapted accordingly.

Figure 6:
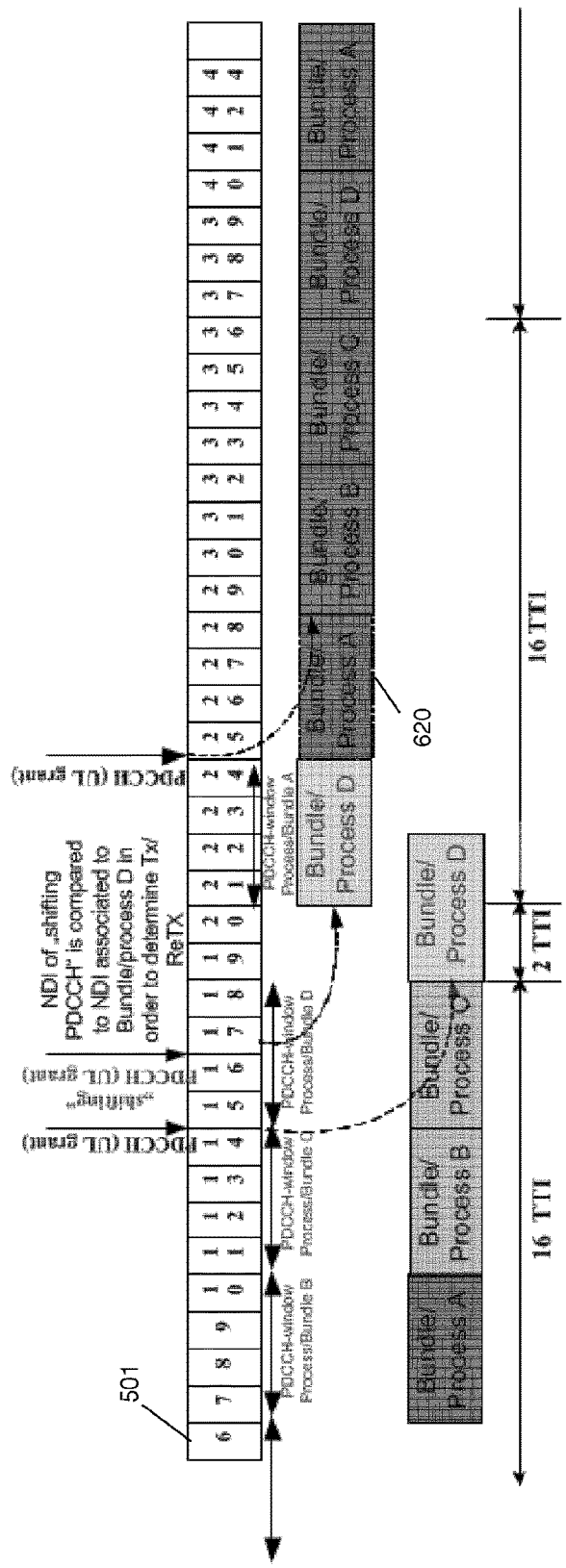
FIG. 6 is a schematic drawing illustrating reception of grant during a TTI-bundle transmission and shifting of the timing without resetting the HARQ buffers according to an embodiment of the invention.

FIG. 6 illustrates an example of such a procedure according to an embodiment of the present invention. In FIG. 6, the subframes 501 starting with subframe 6 and ending with subframe 44 are shown. The mapping 510 of the four processes A, B, C and D is performed in the same way as shown in FIG. 5. However, after receiving the shifting PDCCH, including the uplink grant in subframe 17, the HARQ buffers are not flushed for the four processes but rather the retransmission procedures are continued according to the stored state of the respective retransmission processes. Accordingly, as can be seen in the mapping 620, the transmission or retransmission of the bundle D from subframe 19 is shifted to subframe 21 without any data loss. The timing pattern of the remaining processes of the HARQ protocol is adapted accordingly. The terminal may however continue to use even subframe 19 and 20 for (re)transmission of this Bundle as usual before starting to (re)transmit the Bundle at subframe 21 due to the shifting PDCCH as described below.

As can be seen in FIG. 6, in order to unambiguously associate the grant received on PDCCH with an HARQ process for a TTI bundling case, a PDCCH window is defined, corresponding to the predefined period mentioned above. In particular, the PDCCH window illustrated in FIG. 6 starts at subframe n−4, wherein n is the first subframe of the bundle according to the timing before the shifting (original timing), i.e. the subframe given by the first grant (or from the non-adaptive retransmission in case a PDCCH was not received for this occasion of Bundle transmission starting at the original position i.e. subframe 15 for Process D in the FIG. 6) received for transmitting the bundle.

At the same time, n−1 is the last subframe for the previous bundle, i.e. bundle of the previous HARQ process, assuming the bundle size of four subframes. In this way, a bundle can be shifted, i.e. postponed, according to the last received PDCCH grant within the corresponding window for the given HARQ. However, a bundle can never be preponed in this embodiment. Every process (whether with or without data, i.e. active or inactive) has its corresponding window. Therefore, there would be no unambiguous assignment of the received PDCCH to the respective processes possible. In general, it is also possible to define shorter window than the length of the bundle. For instance: a window from n−4 till n−2 may also be defined alternatively to the window from n−4 till n−1 as described above. Other length, smaller than the bundle size are possible.

FIG. 6 shows an example in which a terminal receives in a subframe 15, an uplink grant associated to the bundle D which includes the data of HARQ process D. The terminal stores, for each process and among them also for the HARQ process D, the status of the retransmissions, such as the status indicating whether the bundle to be transmitted includes new data or a retransmission. Then, the terminal transmits bundle D in accordance with the first PDCCH received in subframe 15 after four subframes resulting in transmission within subframes 19 and 20.

However, if the terminal receives another uplink grant within the PDCCH window in subframe 17 (cf. FIG. 6), the transmission time (subframe) is shifted. Accordingly, here the timing of the transmission is to be shifted by two sub frames i.e. based on a specific (e.g. last) PDCCH received in the PDCCH window. The timing rules are then calculated based on this specific (e.g. last) PDCCH received in the PDCCH window and not based on the PHICH timing anymore for the next bundle transmission (the UE shall upon detection of a PDCCH in subframe n intended for the UE, adjust the corresponding first PUSCH transmission in the bundle in subframe n+4 according to the PDCCH information). Correspondingly, the terminal associates the PDCCH received in subframe 17 with the bundle D transmitted within the process D.

The terminal further compares PDCCH information received within the subframe 17, such as new data indicator with a new indicator value stored for process D. Depending on the comparison result, the terminal will transmit or retransmit the data in bundle D of process D. This enables continuous procedure of HARQ even after the shifting. The timing of the remaining processes is adapted accordingly, including the windows for monitoring the control signaling for grants for the respective HARQ processes.

Therefore, in one possible scenario when the terminal did not received the "original" grant in subframe 15 (for Process D since subframe 15 to 18 is PDCCH window for Process D), it proceeds to make non adaptive retransmissions at subframes 19 and 20. Further, if it received shifting grant in subframe 17 then it will start to transmit a new TB or retransmit the old TB based on the NDI comparison (of the shifting grant/PDCCH with the stored NDI) which is based on the UL Synchronous HARQ operation of the terminal. However, if the UE received the "original" grant in subframe 15 (for Process D since subframe 15 to 18 is PDCCH window for Process D), it proceeds to honor this as usual (based on the UL Synchronous HARQ operation of the terminal described below) for subframe 19 and 20 and update/store its state variable based on this original grant/PDCCH received in subframe 15. Further, if it received shifting grant in subframe 17 then it will start to transmit a new TB or retransmit the old TB based on the NDI comparison (of the shifting grant/PDCCH with the just stored NDI from original grant/PDCCH received in subframe 15).

In UL Synchronous HARQ operation is used. The description of the HARQ operation is given as in 3GPP TS 36.300, v 11.6.0, 8 Jul. 2013, "Overall description; Stage 2" Section 9.1, available freely at www.3gpp.orq and incorporated herein by reference, and is as below:

HARQ operation in uplink is governed by the following principles (summarized in Table below):
1) Regardless of the content of the HARQ feedback (ACK or NACK), when a PDCCH for the UE is correctly received, the UE follows what the PDCCH asks the UE to do i.e. perform a transmission or a retransmission (referred to as adaptive retransmission);
2) When no PDCCH addressed to the C-RNTI of the UE is detected, the HARQ feedback dictates how the UE performs retransmissions:
NACK: the UE performs a non-adaptive retransmission i.e. a retransmission on the same uplink resource as previously used by the same process;
ACK: the UE does not perform any UL (re)transmission and keeps the data in the HARQ buffer. A PDCCH is then required to perform a retransmission i.e. a non-adaptive retransmission cannot follow.

Measurement gaps are of higher priority than HARQ retransmissions: whenever an HARQ retransmission collides with a measurement gap, the HARQ retransmission does not take place.

The following table is a table for the UL operation:

| HARQ feedback seen by the UE | PDCCH seen by the UE | UE behaviour |
| --- | --- | --- |
| ACK or NACK | New Transmission | New transmission according to PDCCH |
| ACK or NACK | Retransmission | Retransmission according to PDCCH (adaptive retransmission) |
| ACK | None | No (re)transmission, keep data in HARQ buffer and a PDDCH is required to resume retransmissions |
| NACK | None | Non-adaptive retransmission |

A new Transmission for a TB is "generally" when the new received NDI value is considered toggled compared to the stored NDI value or if this is the very first received transmission for this TB (i.e. there is no previous NDI for this TB). Similarly, "generally" the Retransmission is when the NDI value is considered as not toggled. This is explained in detail in 3GPP TS 36.321 Section 5.4 (cited above) for UL transmission.

In LTE (cf. 3GPP TS 36.321 v 12.8.0, Section 5.4.2, cited above) there is one HARQ entity at the terminal, which maintains a number of parallel HARQ processes allowing transmissions to take place continuously while waiting for HARQ the feedback on the successful or unsuccessful reception of previous transmissions. The number of parallel HARQ processes is configurable. At a given TTI, if an uplink grant is indicated for the TTI, the HARQ entity identifies the HARQ process for which a transmission should take place. It also routes the received HARQ feedback (ACK/NACK information), MCS and resource, relayed by the physical layer, to the appropriate HARQ process.

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle.

Figure 1:
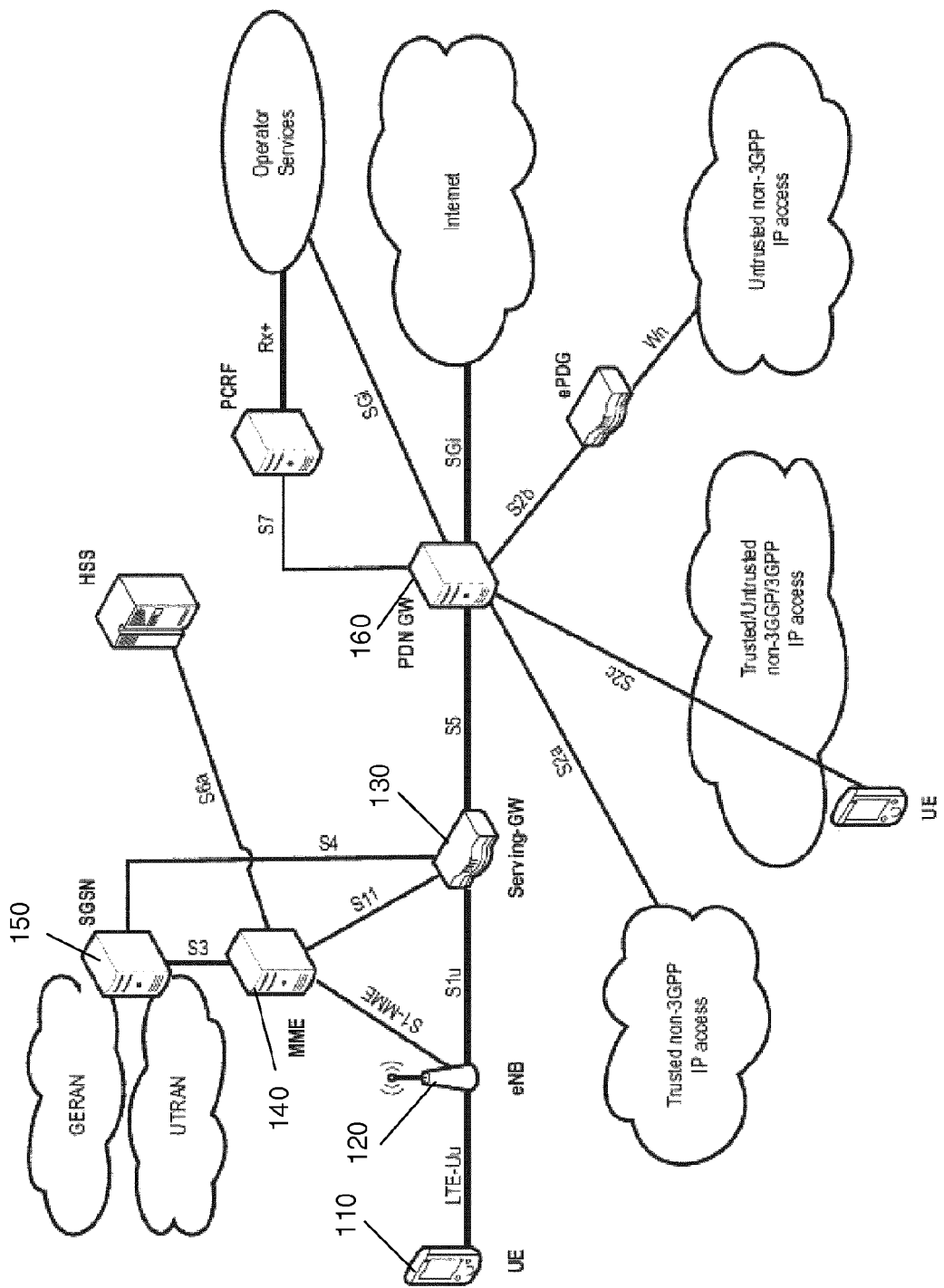
FIG. 1 is a block diagram illustrating an example of physical layer processing of four services in a digital broadcast system.
Figure 2:
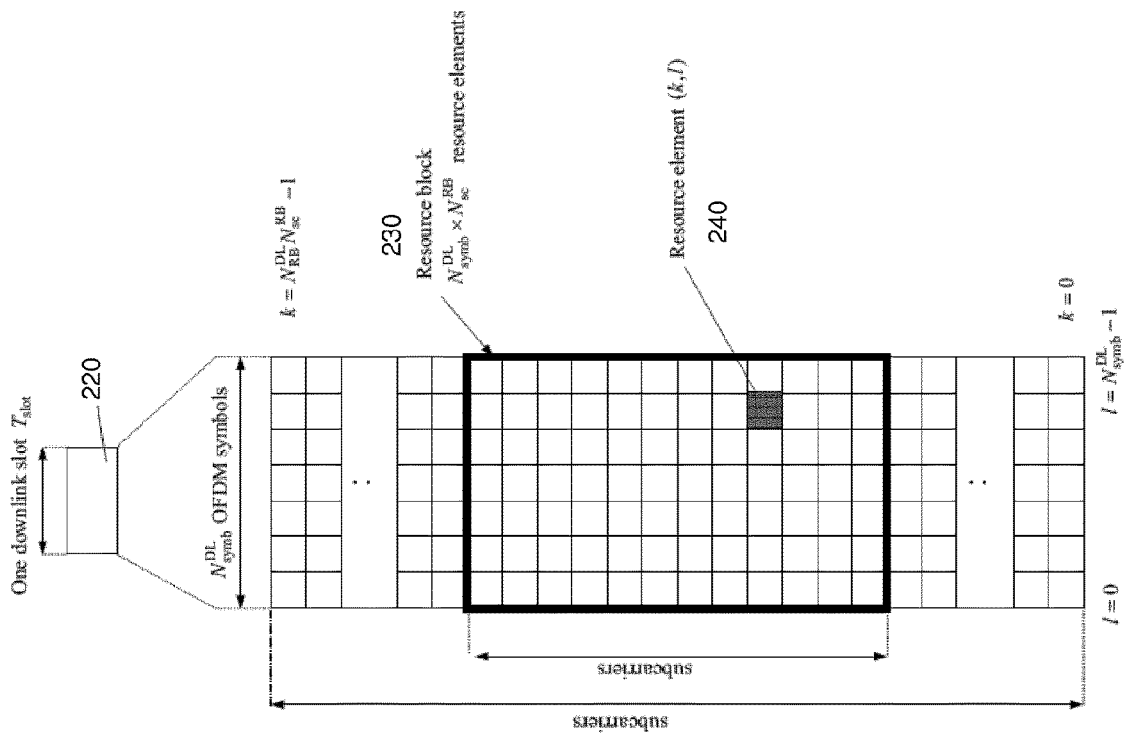
FIG. 2 is a schematic drawing illustrating an example of a grid of OFDM modulation resources in time and frequency domain.
Figure 3:
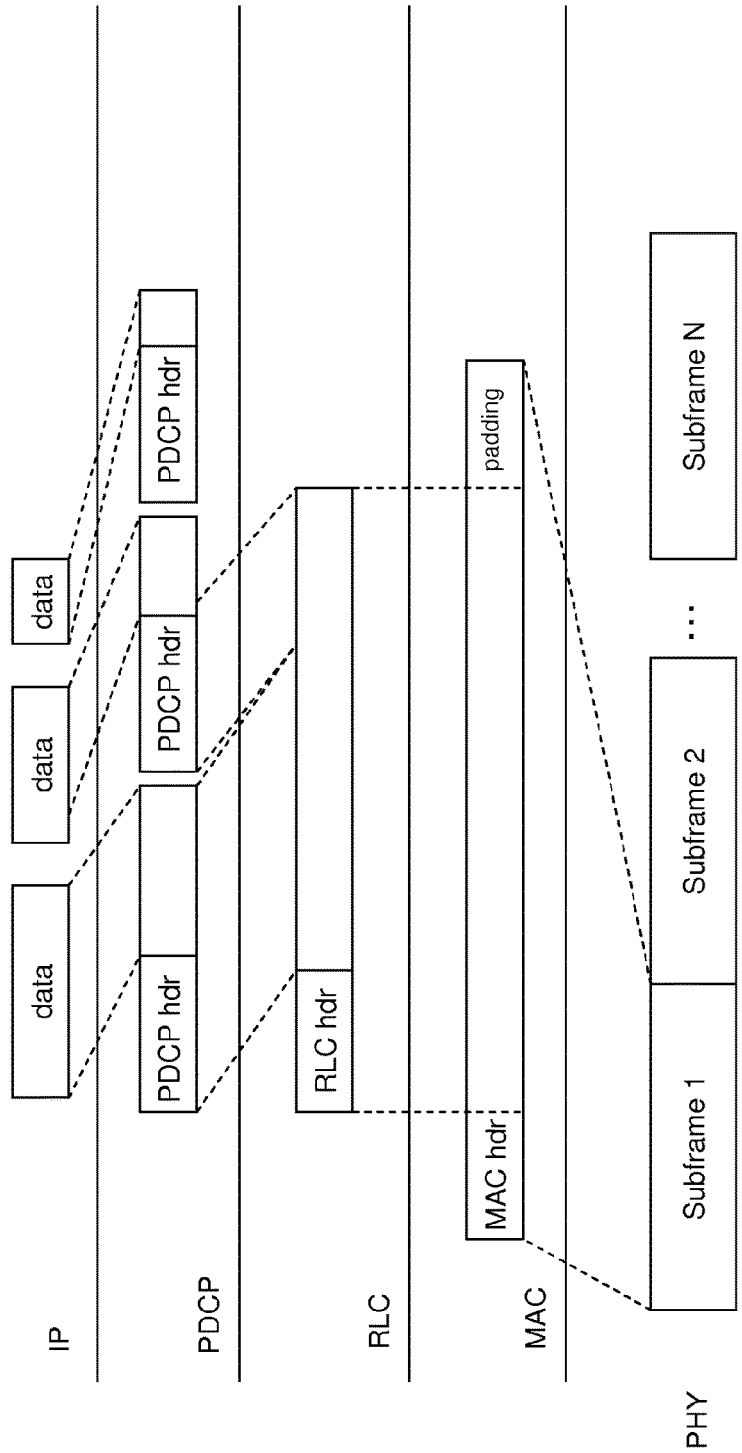
FIG. 3 is a schematic drawing illustrating an example of the resource mapping from the IP packet data onto the physical layer of the LTE.

The present invention is applicable for transmitting data on a shared communication channel in a communication system which supports multiple hybrid automatic repeat request (HARQ) processes. The communication system is configurable to apply a bundling of transmission time intervals so that as soon as bundling is configured, a single grant to transmit data applies to a bundle and the bundle includes a predetermined number of TTIs belonging to the same HARQ process. The data transmission includes mapping of the TTIs onto subframes, wherein the subframes are physical resources defined in a time domain as exemplified above for the LTE system described with reference to FIG. 2. According to an embodiment of the present invention, the terminal performs the following steps. The terminal monitors configured signaling channels such as PDCCH which carry grants to transmit TTI bundles for the terminal. As soon as a grant for a TTI bundle/HARQ process is received, the terminal decides to transmit or not to transmit the bundle in a subframe which is given by the received grant. In particular, said bundle is transmitted in the indicated subframe if no further grant for the same bundle is received within a predetermined time window before the indicated subframe. The bundle is not transmitted if another grant for the same bundle is received within the predetermined time period.

This behavior of the terminal results in determining the subframe for transmission of the bundle corresponding to the shift of the timing based on the latest received grant within the predetermined time period. The predetermined time period enables to unambiguously associate the received grant with the corresponding bundle. Moreover, after determining the subframe in which the bundle is to be transmitted, the new timing pattern for all current processes is determined. Accordingly, also the position of the predetermined time period for the following HARQ processes is determined according to the position of the subframe in which the bundle is transmitted. It is noted that the transmission of the bundle may be an initial transmission or a retransmission in accordance with the state of the HARQ process for the current bundle given by a new data indicator received together with the grant within the signaling information and/or based on the state stored in the terminal.

As shown in FIG. 6, the TTIs of each bundle of N TTIs, N being an integer larger than 1, are mapped on respective consecutive subframes in such a way that the one TTI is mapped to one respective subframe. The predetermined time period is preferably equal to the size of the bundle N. The predetermined time period is advantageously located immediately before the subframe given by the first received grant, i.e. the starting subframe of the previous bundle in the previous HARQ process. It is noted that in the example in FIG. 6, N=4. However, other numbers such as N=2 or N=8 may be applied. Selecting the bundle size corresponding to powers of 2 enables more efficient resource grouping and signaling. Nevertheless, in general, any size of bundle may be selected. The size of the bundle N may therefore correspond to the size of the window and may also beneficially correspond to the gap between receiving a grant and transmitting the data for which the grant was received.

When applying the mechanism of the present invention, it may be beneficial to reduce the probability of false uplink grants, which would cause shifting of the TTI bundling pattern. Accordingly, in order to increase the robustness of PDCCH grant reception, according to an embodiment of the present invention, some values of parameters transmitted on the PDCCH are evaluated in order to determine whether or not the grant received on the very PDCCH is to be taken into account. In other words, based on values of signaling information transmitted together with the grant, it is detected whether the received grant is indeed the shifting grant meant to adapt the subframe timing or whether it is only a false grant. This is possible when there are some assumptions about the value of the parameter so that the received parameter may be checked with the expected value.

For instance, resource block allocation (assignment, corresponding to RBA in the DCI of the PDCCH in LTE) size indicated in the shifting PDCCH should be the same as the RB allocation size used for the last transmission of the associated bundle/process. In order to enable this check, a rule is to be set up and applied by both data transmitting and data receiving node. According to the rule, the allocation size for the transmissions within the same process should not change for the first bundle transmission after the shifting PDCCH. Alternatively, in order to check only the correctness of the other grant than the first grant for the same bundle, a rule may be defined that the resource block allocation size (the number of resource blocks allocated within the given subframe) does not change between the first and the further grants for the same bundle. This is less limiting than fixing the allocation size for the entire process.

Alternatively, or in addition, the redundancy version signaled within the control information in the shifting PDCCH together with the grant may be used for checking. In LTE, the redundancy version may take 4 values 0 to 3. The number increases modulo 4 with each further retransmission of the same bundle. However, the first grant and the following shifting grants may be assumed to be signaled with the same redundancy version if the protocol is to continuously work after shifting. Thus, the redundancy version in the first grant may be required to be the same as the redundancy of the shifting grant. This means that the redundancy version of the bundle to be transmitted must correspond to the redundancy version indicated by the signaling information also carrying the grant.

Moreover, the evaluation may also be performed based on the search space. In general, the search space may be a common search space (SCC), in which all terminals are blindly decoding the resources in order to find out whether there is control information for them. Then there is a user search space (USS), which is configured for particular users (terminals) to, in addition to CSS, monitor therein the control information transmitted.

In particular, some rules may be set for transmitting the shifting grants. For instance, the shifting PDCCH is expected to be on the same search space as the previous PDCCH for the same HARQ process. Or the shifting PDCCH is expected to be located in the UE Specific search space (USS) for the initial transmissions and retransmissions. One other possibility is that the shifting PDCCH is on a different search space than the one used for the previous transmission which was started by a regular PDCCH. Moreover, a rule may be applied according to which the first and the further grant are located on the same control channel element (CCE), i.e. a location within a search space. Then there is a possibility of a rule according to which the further grant is located shifted by a particular number of CCEs from the first grant within the search space. Moreover, a rule may concern not only the first and a further grant within the same predetermined time period but rather a rule for transmitting grants in general. For instance, a grant for a bundle may be located shifted with respect to the grant of the previous bundle of the same process or similar rule apply. In general—a rule may be defined constraining the location of the shifting grant in a particular search space and/or within the search space. When this rule is applied by both data transmitting and data receiving node, the false grant detection is enabled by checking whether the rule is satisfied at the reception of the grant.

Another possibility of increasing the robustness of transmitting the uplink grants may be provided by means of the network, which could transmit more than one shifting PDCCH within the PDCCH window associated with the bundle. In other words, signaling including the same values applicable to shifting of the timing may be transmitted more than once within the window. In order to achieve higher robustness, the terminal would also expect to receive more than one PDCCH. Thus, according to this embodiment, a rule is to be set up, according to which the network always transmits in at least two consecutive subframes same control information within the window for the same bundle/process. In such case, only one of the (e.g. the last) PDCCH would be taken for shifting. However, robustness is increased since a probability of two identical PDCCH control information received consecutively is rather low in a usual traffic.

In other words, the method for transmitting data further includes a checking step for judging upon reception of the last grant within the predetermined time period whether identical control information has been received within the same predetermined time period. If affirmative, the shifting of the timing pattern is performed. Otherwise, the last grant is ignored. Preferably, the identical control information is transmitted within consecutive subframes both within the same time window, i.e. same predetermined time period. Similarly, according to this embodiment, a data receiving node may be provided, which transmits identical control information twice, preferably in two consecutive subframes, to the data transmitting node in order to achieve shifting of the timing pattern for grants, data transmissions, feedback and/or retransmissions.

It is noted that the data transmitting node—as described in most of the above examples—may be a terminal transmitting in the uplink data to the receiving node which may be a NodeB (base station) or a relay node. However, the present invention is not limited to such embodiments and may equally work in the downlink direction for transmitting data from a network node such as a base station or a relay node to the terminal. Moreover, the transmission and reception may be performed between a base station and a relay in uplink or downlink. In general the present invention can be applied to any two nodes of which one receives and the other transmits the data using a multi-process ARQ procedure on a channel on which the transmission scheduling are governed by control information, i.e. by transmission grants.

For performing HARQ procedure appropriately, the terminal keeps HARQ state variables as briefly described above for the LTE. In order to consistently support the TTI bundle timing shifting as suggested above, according to an embodiment of the present invention the counter CURRENT_TX_NB, which is kept to count the number of (re)transmissions made for a single HARQ process, is not increased for the PUSCH transmissions of the unfinished bundle which is to be shifted later. For instance, in the example described with reference to FIG. 6, the CURRENT_TX_NB is not increased for PUSCH transmissions in subframes 19 and 20 because the bundle shall finally be transmitted in the subframe 21 due to shifting and in the following subframes. By this operation, it is ensured that a complete TTI bundle will be transmitted after performing the shifting.

In other words, the data transmitting node maintains a counter stored for counting transmissions within the same HARQ process. The counter is maintained separately for each HARQ process. When the shifting of the TTI-bundle transmission time occurs as a consequence of receiving the last grant within the predetermined time period different from the first grant, the counter is increased only for the PUSCH (re)transmissions corresponding to the latest/last grant within the predetermined time period. Thus, when a grant is received for a TTI bundle of a certain HARQ process, the data transmitting node transmits said bundle in said certain HARQ process in a subframe which is given by said grant if no further grant for the same bundle is received within a predetermined time period before the subframe given by said grant and increases the transmission counter stored. The data transmitting node does not transmit said bundle if another grant for the same bundle is received within the predetermined time period and does not increase the transmission counter or, in a different alternative, it transmits the part of the said bundle (TTIs) until the PUSCH transmissions from the shifting PDCCH are started but it may not increment the said counter for the partial bundle transmission(s) from the PDCCH grant that was received prior to the shifting PDCCH. In yet another alternative, the transmitting node only counts first/any few TTI Bundle transmissions corresponding to TTI Bundle Size and ignores the remaining (re)transmissions. Apart from the HARQ state variables, the HARQ timing may also be adapted to the shifted grant-transmission timing. This is especially beneficial for systems in which the HARQ feedback and retransmission timing is fixedly depending on the location of the grant and/or data transmission. However, it is noted that the present invention is not limited to the cases in which the entire feedback and retransmission timing depends on the time point of the grant reception.

Concerning the feedback channel PHICH in LTE, which carries the positive or negative acknowledgements for the bundle (feedback information), the terminal transmitting data in the uplink advantageously does not expect to receive the feedback for the unfinished bundle transmission in the case of shifting PDCCH. In particular, in the example described with reference to FIG. 6, the terminal does not expect HARQ feedback for the transmission started in subframes 19 and 20. Accordingly, upon shifting the timing due to receiving multiple grants within the window, the timing of the PHICH is also shifted accordingly. New PHICH/PDCCH timing thus starts with the first transmission of the shifted bundle. In the example described with reference to FIG. 6, the transmission of the shifted bundle D starts at subframe 21. After shifting the TTI bundling pattern, first PUSCH transmissions for each of the HARQ process must be started by the PDCCH. Thus, the terminal expects that PDCCH in subframe 21 is received for process A. Similarly, a PDCCH in subframe 25 is received for process B and a PDCCH in subframe 29 is received for process C. If the PDCCH is received in other subframes that mentioned for the corresponding processes, it will be taken as a new shifting PDCCH for that process.

This behavior can also be achieved by the terminal setting HARQ feedback for HARQ processes to positive acknowledgement (ACK) after the shifting i.e. when the UE receives a shifting PDCCH, it would set the HARQ_FEEDBACK for each of the process to ACK. HARQ_FEEDBACK is a state variable stored per process in the data transmitting node. This may be beneficial in order to confirm from the data transmitting node to the data receiving node that a timing change is correctly performed.

In other words, when the shift of the timing is performed starting in a first process (process D in FIG. 6), the data transmitting node (such as terminal in the uplink) sets its feedback state variable to positive acknowledgement. In such configuration, the terminal expects reception of further grant and does not transmit data without receiving the grant. If the feedback state variable was set to negative acknowledgement, a retransmission could take place without expecting/receiving grant, i.e. for instance also still according to the old timing in case of a wrong reception.

Figure 4:
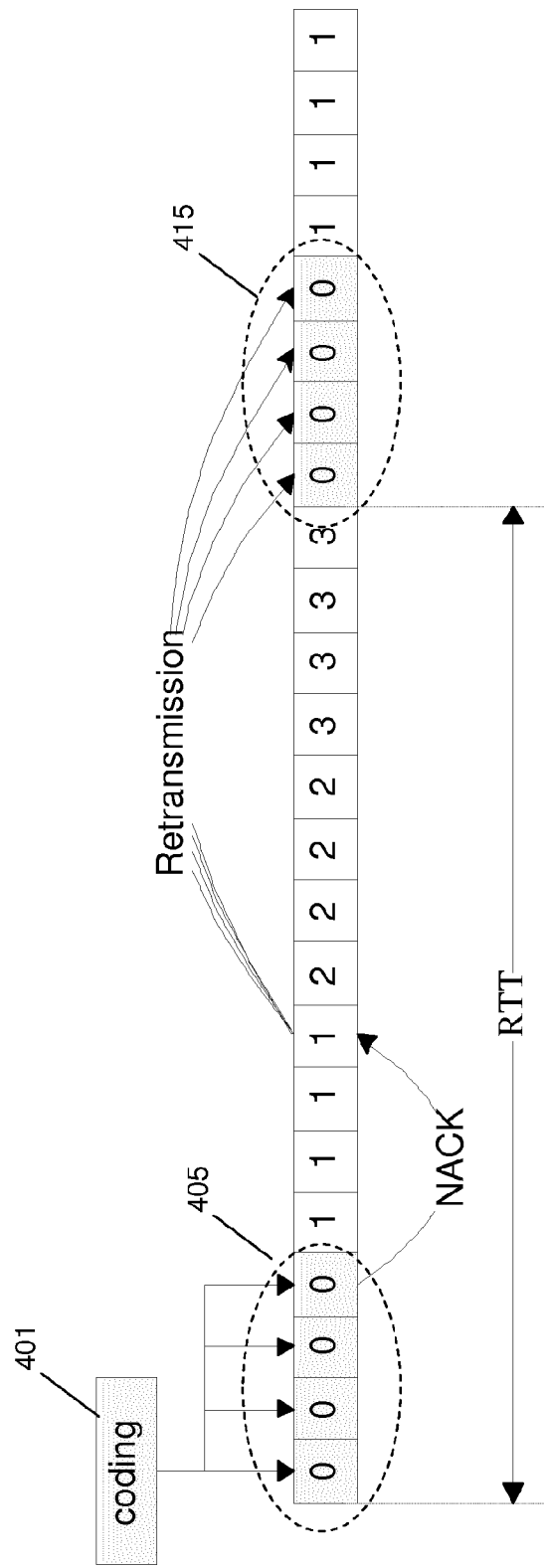
FIG. 4 is a schematic drawing illustrating TTI bundling in context of a multi-process ARQ protocol.

Concerning the PHICH timing, in LTE an acknowledgement is transmitted after 4 subframes from the data transmission and a retransmission is performed 7 subframes after the feedback reception if the feedback was a negative acknowledgement (NACK) in case no TTI-bundling is configured. If TTI bundling is configured, as illustrated in FIG. 4, the feedback (positive or negative acknowledgement) is expected after 4 subframes from transmitting the last TTI in the bundle and the retransmission is expected 9 subframes after receiving the feedback, if the feedback was negative. However, the present embodiment is not limited to such timing and is applicable to other fixed or configurable timings.

In accordance with another embodiment of the present invention, the PDCCH including the grant for a bundle is only transmitted (consequently also received) only once per single bundle. This may be performed according to a predefined TTI bundle pattern. For instance, the PDCCH is transmitted in the four millisecond raster (assuming that a subframe has the length of 1 millisecond) as also illustrated in FIG. 6 for the first grants. However, according to the present embodiment also the shifting PDCCH is transmitted according to this pattern. In particular, the terminal ignores PDCCH (uplink grant) which would result in a schedule of bundle transmission (on PUSCH) not starting at the TTI bundle boundary (i.e. in the TTI raster).

In order to enable dynamic TTI bundle scheduling, in the present embodiment, the PDCCH content indicates the TTI shift, which could be 1, 2 or 3 subframes. This may be implemented by introducing a new field within the DCI. The new field, called for instance "TTI offset", signals the shift of 1, 2, or 4 subframes. Alternatively, the TTI shift (offset) may be signaled by means of specific codes points of the current DCI format. For instance, some entries of the modulation and coding scheme (MCS) table could be used to signal the shift by 1, 2 or 3 milliseconds (subframes). For example, the MCS entries 29, 30 and 31, currently reserved, given by parameter $I_{MCS}$ in TS 36.213 [23, Table 7.1.7.1-1], may be interpreted as indicating the TTI offset of respective 1, 2 and 3 milliseconds.

Figure 7:
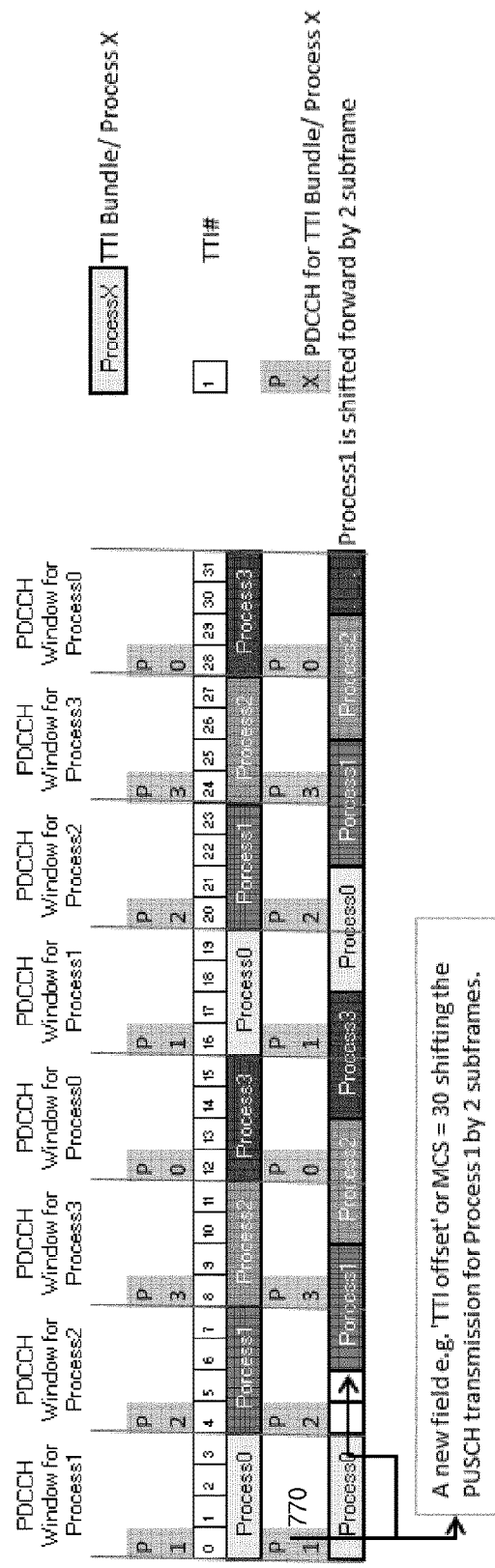
FIG. 7 is a schematic drawing illustrating reception of grant at the beginning of a TTI-bundle transmission and shifting of the timing without resetting the HARQ buffers according to an embodiment of the invention.

FIG. 7 illustrates this embodiment. Four processes 0 to 3 are defined. At the beginning of each bundle, respective grants (PDCCH) P0 to P3 are received in a regular raster. The grants may now carry a TTI shift ("TTI offset"), which indicates shifting by 1, 2 or 3 subframes (in general N−1 subframes when N is length of the bundle). This is illustrated in FIG. 7 by the grant 770 transmitted in the PDCCH P1 to process 1. The PDCCH P1 indicates a TTI offset of two subframes. The corresponding process 1 is then shifted accordingly and also the following other processes.

In general, the steps of a method for data transmitting according to the present embodiment of the invention include the following steps performed at a data transmitting node: receiving a grant to transmit a bundle of TTIs in an HARQ process, the grant including a shift indicator indicating a number of subframes; and transmitting said bundle in said HARQ process in a subframe which is given by said grant and the number of subframes indicated by the shift indicator.

In this way, the association of shifting PDCCH (grant) to HARQ processes is unambiguously given by the timing of the PDCCH with respect to the timing of data transmission. The HARQ protocol operation is continued across TTI bundle shifting as in the above described other embodiments.

Explicit signaling of the TTI shift has an additional advantage of reducing the probability of false alarms caused, for instance, by false PDCCHs received. This is due to the fact that the PDCCH can only occur at predefined timing, namely, for instance each N subframes, N being the length of the bundle.

According to an embodiment of the present invention, groups of subframes of the physical layer form a timing raster (pattern). The groups have size of a bundle size. This means that when there are N subframes per bundle (N TTIs per bundle), then the timing raster is given by the groups of N subframes (starting at an arbitrary subframe. The pattern means that a grant is expected for a bundle at the beginning of the group, i.e. in the first subframe of the group. As soon as a grant is received in other position within the group, it is a shifting grant, which causes the shifting of the entire raster. The shift is given by the offset between the received shifting grant and the first subframe in the group. The shifting of the time pattern is not limited to shifting the bundle transmission times with respect to the grant reception times. In addition, the shifting may advantageously apply to the HARQ procedure, i.e. for the reception of feedback (acknowledgements) and retransmissions. Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein.

Figure 8:
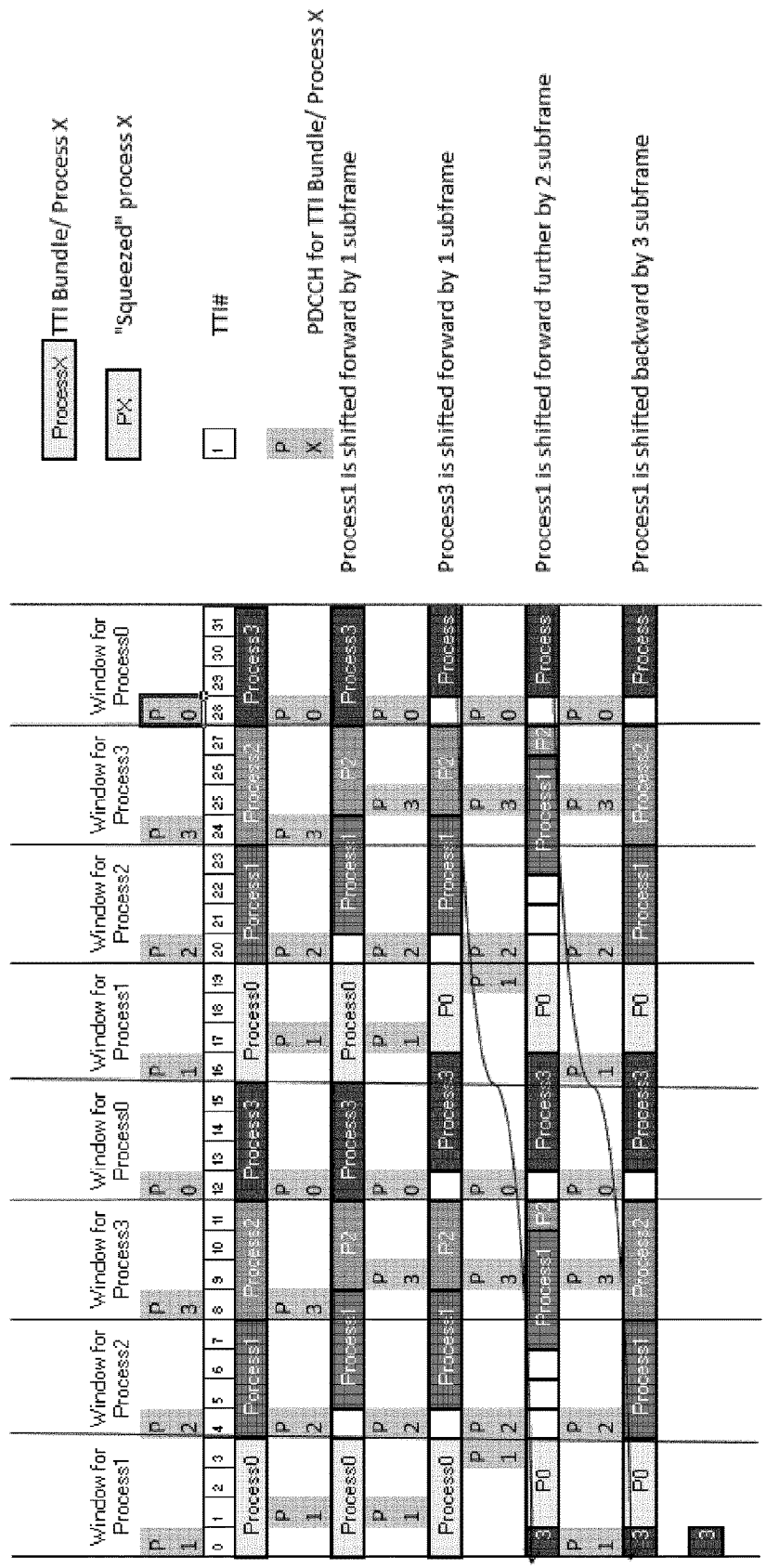
FIG. 8 is a schematic drawing illustrating an embodiment according to which the length of bundle is shorter for the process following the shifted process than for other processes.
Figure 9:
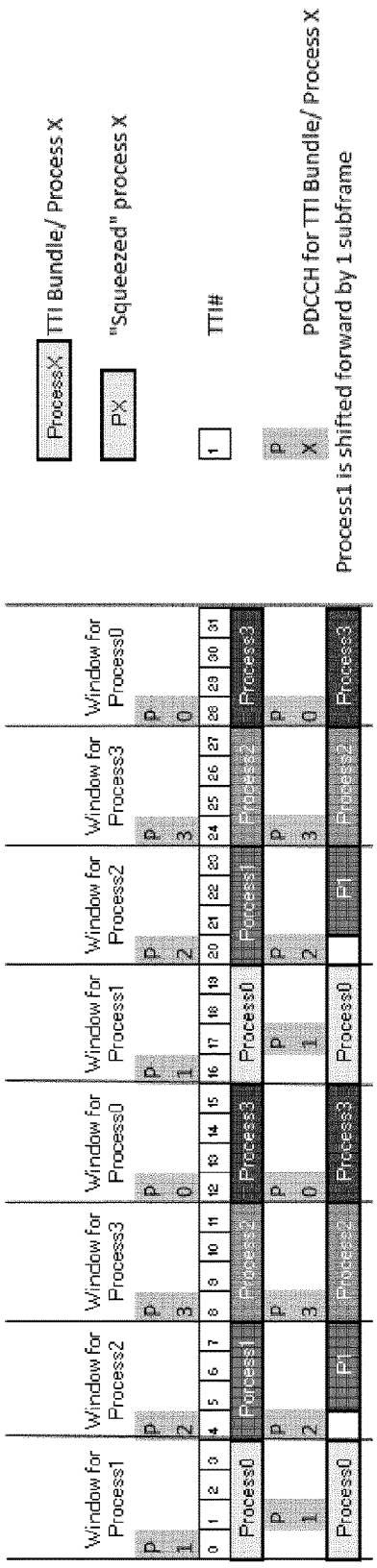
FIG. 9 is a schematic drawing illustrating an embodiment according to which the length of bundle is shorter for the shifted process than for other processes.

An embodiment of the present invention is shown in FIGS. 8 and 9. According to this embodiment, upon reception of a shifting grant for a certain bundle in a certain process, the transmission of the certain bundle and the entire certain process is shifted. However the timing of other certain process is not shifted. In order to avoid colliding of the shifted process with the process that is not shifted, the bundle of the following process is "squeezed", i.e. shortened by the length of the shift of the certain process. Alternatively, the certain process for which a shifting grant was received is squeezed, i.e. its bundle size (number of subframes transmitted within the bundle) is reduced by the length of the shift.

As can be seen in FIG. 8, every TTI Bundle/Process has a fixed window (predetermined time period as described above) of size equal to TTI_BUNDLE_SIZE. The windows are equal and adjacent. Any PDCCH that is received in this window will provide a grant for the corresponding TTI Bundle/HARQ process as shown in the FIG. 8. When the PUSCH transmissions from a shifting PDCCH collide/overlaps with the 'original' PUSCH transmission of the following HARQ process then one of them takes priority; e.g. in FIG. 8, the PUSCH transmissions from a shifting PDCCH takes priority and the following HARQ process then gets 'squeezed' in remaining subframes of the process (i.e. it does not get shifted into the PUSCH transmissions of the further following HARQ processes).

In a possible alternative, the PUSCH transmissions from a shifting PDCCH itself do not get shifted into the PUSCH transmissions of the following HARQ processes and thus shifting only squeezes "this PDCCH shifting bundle" (shown in FIG. 9).

Figure 10:
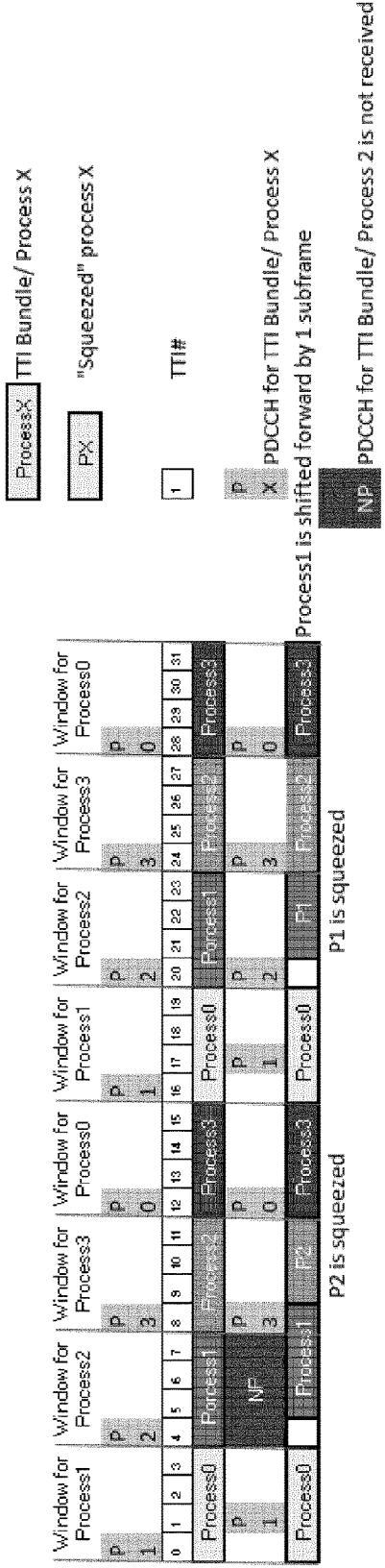
FIG. 10 is a schematic drawing illustrating an embodiment according to which the length of bundle is shorter for the process following the shifted process or for the shifting process than for other processes, depending on whether a grant is received for the process following the shifted process.

Yet another embodiment is illustrated in FIG. 10. Accordingly, rules are defined for transmitting of the grants. For instance, a PDCCH is always honored (UE makes transmissions based on received PDCCH whether resulting into PUSCH (re)transmissions contained in 'original' TTIs or even extending onto 'shifted TTIs' (e.g. TTI#8 for Process 1 in the lower part of FIG. 10) when situation permits it. The latter (extension onto 'shifted' PUSCH TTIs of the next HARQ process) happens when there was no corresponding PDCCH received for process x+1; in which case the shifting PUSCH transmissions due to a shifting PDCCH of the process x takes precedence and the non-adaptive re-transmissions of the process x+1 due to PHICH NACK received is done on the "remaining" subframes. This is illustrated in FIG. 10 wherein NP (No PDCCH) is received for Process 2 in the corresponding PDCCH window and therefore Bundle/process 1 (re)transmission is extended onto subframe number 8 (and process 2 (re)transmission is squeezed). However, on subframe 20, the PDCCH for process 2 is received and therefore, this takes priority resulting into squeezed process 1 transmission in subframes 21, 22 and 23.

In the embodiments described with reference to FIGS. 8 to 10 it is beneficial, if—as described above in connection with the other embodiments, all TTIs in a bundle carry the same data. Then the squeezing of a process does not mean reduction of data rate for the squeezed process but rather reduction of robustness due to reduction of redundancy.

In the embodiments described with reference to FIGS. 8 to 10, the window (predetermined time period) for receiving a grant is fixed irrespective of shifting/no-shifting based on the very initial transmission for this process. The fixed window starts with the very initial transmission for this process with the window length equaling the TTI Bundle Size. Irrespective of the shifting of the bundled transmissions for a given process, the predetermined time period (PDCCH-Window) does not shift i.e. every TTI Bundle/Process has a fixed window (predetermined time period as described above) of size equal to TTI_BUNDLE_SIZE. The windows are equal and adjacent and fixed so that it is clear which HARQ process is being shifted when a PDCCH arrives anywhere in this fixed window. Any PDCCH that is received in this window will provide a grant for the corresponding TTI Bundle/HARQ process as shown in the FIG. 8. However, the remaining processes are not shifted, i.e. their timing is not changed but could possibly be squeezed. For the squeezed process, the window is not squeezed and still remains fixed based on the "very initial" transmission for this process. The fixed window starts with the very initial transmission for this process with the window length equaling the TTI Bundle Size and remains so throughout the lifetime of the process (as shown by the long vertical lines in the respective FIGS. 8, 9 and 10)

It is noted that the above described embodiments for increasing robustness of the PDCCH detection (in general, the detection of the shifting grant) are applicable to any of the above embodiments.

For example the data transmitting apparatus's functions, the signaling mechanisms, the sub-frame generation, the mapping of PDCCH information to appropriate OFDM symbols of the (R-)PDCCH region in the sub-frame, the PDCCH reception and handling at the data transmitting node etc. may be for example implemented in hardware and/or software. Similarly, the processing of the received sub-frames at the receiving apparatuses may at least partly implemented in hardware and/or software. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the concepts and sub-frame structures proposed herein may be readily applied in the architectures described in the Technical Background section. Furthermore, the concept of the invention may be also readily used in the LTE-A RAN currently discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

Summarizing, the present invention relates to transmitting data on a shared communication channel in a communication system supporting multiple hybrid automatic repeat request processes and configurable to apply a bundling of transmission time intervals. The data transmitting including mapping of TTIs of the HARQ processes cyclically onto subframes. In order to efficiently support dynamic bundle scheduling, when a grant is received during a bundle transmission, this grant becomes a shifting grant, according to which the bundle is transmitted and according to the location of which the timing of the grant reception and the data transmission is adapted. The transmission of the shifted bundle is performed in accordance with the state of its retransmission process, i.e. the bundle is either initially transmitted or retransmitted. The main benefits from the invention includes the HARQ process continuity since the HARQ buffers need not be flushed and therefore a better user/higher layer experience/better efficiency is possible. Also, part of the invention pertain to increasing PDCCH decoding reliability thereby ensuring that both the terminal and the network are in sync with regard to the time and the content of the transmissions. Other parts of the invention provide a simple rule of mapping the received "shifting" PDCCH to appropriate HARQ processes. Still invention in parts provides method of correct state variable (e.g. NDI) comparison between the state variable of the received "shifting" PDCCH and the ones stored for the said appropriate process (es).

The invention claimed is:

1. A method for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs of the HARQ processes cyclically onto subframes which are physical time-domain resources, the method comprising the following steps performed at a data transmitting node:
receiving a grant to transmit a bundle of TTIs in a HARQ process;
transmitting the bundle of TTIs in the HARQ process in a subframe which is given by said grant if no further grant for the same bundle is received within a predetermined time period before the subframe given by said grant; and
not transmitting the bundle of TTIs if another grant for the same bundle is received within the predetermined time period.

2. The method according to claim 1, wherein
the TTIs of each bundle of N TTIs, N being an integer larger than 1, are mapped on respective consecutive subframes, one TTI onto one subframe;
the predetermined time period is equal to N subframes before the subframe given by a first grant received for the bundle in the HARQ process; and
the method further includes determining the position of the predetermined time period for another HARQ process according to the position of the subframe to which the transmission of said TTI bundle was shifted with respect to the position given by the first grant as a result of receiving within the predetermined time period the other, shifting, grant.

3. The method according to claim 1, wherein
said bundle in said HARQ process is transmitted in a subframe, the position of which is determined as:
the Mth subframe from the position of a first grant received within the predetermined time period if a single grant was received within the predetermined time period; and
the Mth subframe from the position of a last grant received within the predetermined time period if more than one grant were received within the predetermined time period,
wherein M is an integer larger than 1.

4. The method according to claim 1, further comprising:
storing, for each HARQ process, a process state including a new data indicator, NDI, of which a value indicates whether a next transmission is a first transmission of the entire bundle or a retransmission of the entire bundle,
wherein the grant to transmit the bundle is received within control data further including an NDI value for the granted transmission;
upon reception of the grant comparing the stored and the received NDI values; and
based on a result of the comparing transmit new data in the bundle or retransmit the data from the last transmitted bundle of the same HARQ process.

5. The method according to claim 1, further comprising the step of:
upon receiving a grant, evaluating values of at least one of the following parameters for received within the control information carrying the grant based on a predefined rule and/or based on a value received with a previous grant and stored:
number of resource blocks for the subframe in which the TTI bundle is to be transmitted, wherein each subframe includes a plurality of physical resource blocks in frequency domain allocable,
redundancy version indicating the type of coding of the TTI bundle to be retransmitted, or
location of the control information carrying said grant within a search space; and
in accordance with the evaluation discard the grant received or transmit data accordingly.

6. The method according to claim 1, further comprising the steps of:
upon receiving a grant, determining whether, within the predetermined time period, control information having similar contents as the control information carrying said grant has been received;
discarding said grant if no control information with similar contents as the control information carrying said grant has been received within the predetermined time period.

7. The method according to claim 1, further comprising the step of
storing a transmission counter at the data transmitting node, wherein the transmission counter is increased if the entire TTI bundle is transmitted and is not increased if not the entire TTI bundle is transmitted, and/or
storing a feedback state for each HARQ process at the data transmitting node, wherein the feedback state for each process is set to indicate reception of a positive acknowledgement if the entire bundle is transmitted after reception of the grant during a bundle transmission.

8. The method according to claim 1, further comprising the step of:

determining a subframe position of the feedback information reception for said HARQ process and/or another HARQ process according to the position of the subframe to which the transmission of said TTI bundle was shifted with respect to the position given by the first grant as a result of receiving within the predetermined time period the other, shifting, grant, wherein the feedback information includes at least either a positive or a negative acknowledgement; and if in the determined subframe position a negative acknowledgement is received, determining a subframe position for retransmitting the entire bundle according to the determined subframe position of the feedback information.

9. A method for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the method comprising the following steps performed at a data transmitting node:

receiving a grant to transmit a bundle of TTIs in an HARQ process, the grant including a shift indicator indicating a number of subframes smaller than a predetermined time period which is smaller or equal to the number of TTIs per bundle; and transmitting the bundle of TTIs in the HARQ process in a subframe which is given by said grant and which is shifted by the number of subframes indicated by the shift indicator.

10. The method according to claim 9, wherein grants including the shift indicator are expected to be received only at predetermined timing given by a position of a first subframe within TTI bundles; and grants received at other timing are ignored.

11. A method for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the method comprising the following steps performed at a data receiving node:

transmitting to a data transmitting node a grant to transmit a bundle of TTIs in a HARQ process, the grant including a shift indicator indicating a number of subframes smaller than a predetermined time period which is smaller or equal to the number of TTIs per bundle; and receiving said bundle in the HARQ process in a subframe which is given by said grant and shifted by the number of subframes indicated by the shift indicator.

12. The method according to claim 9, wherein the shift indicator is carried by:

a separate field within the control information carrying the grant or some predefined codepoints of a modulation and coding scheme coding table which is further used to define codepoints for certain combinations of modulation and coding scheme.

13. The method according to claim 1, further comprising the step of:

when a bundle of a shifted HARQ process is transmitted upon reception of a grant during the predetermined time window for this process, shortening the number of TTIs per bundle of the shifted HARQ process and not shortening the number of TTIs per bundle of the remaining HARQ processes, or when a bundle of a shifted HARQ process is transmitted upon reception of a grant during predetermined time window for this process, shortening the number of TTIs per bundle of the process following the shifted HARQ process and not shortening the number of TTIs per bundle of the remaining HARQ processes, or when a bundle of a shifted HARQ process is transmitted upon reception of a grant during predetermined time window for this process, shortening the number of TTIs per bundle of the shifted HARQ process and not shortening the number of TTIs per bundle of the remaining HARQ processes if for the process following the shifted process a grant is received, and shortening the number of TTIs per bundle of the process following the shifted HARQ process and not shortening the number of TTIs per bundle of the remaining HARQ processes if for the process following the shifted process a grant is not received within the predetermined time period.

14. An apparatus for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs of the HARQ processes cyclically onto subframes which are physical time-domain resources, the apparatus comprising:

a receiving unit for receiving a grant to transmit a bundle of TTIs in an HARQ process;

a transmitting unit configured for transmitting the bundle of TTIs in the HARQ process in a subframe which is given by said grant if no further grant for the bundle of TTIs is received within a predetermined time period before the subframe given by said grant; and not transmitting the bundle of TTIs if another grant for the bundle of TTIs is received within the predetermined time period.

15. An apparatus for transmitting data on a shared communication channel in a communication system supporting multiple hybrid automatic repeat request, HARQ, processes and configurable to apply a bundling of transmission time intervals, TTI, wherein when bundling is configured, a single grant to transmit data applies to a bundle including a predetermined number of TTIs belonging to a same HARQ process, the data transmitting including mapping of TTIs onto subframes which are physical time-domain resources, the apparatus comprising:

a receiving unit configured for receiving a grant to transmit a bundle of TTIs in a HARQ process, the grant including a shift indicator indicating a number of subframes smaller than a predetermined time period which is smaller or equal to the number of TTIs per bundle;

a transmitting unit configured for transmitting said bundle in the HARQ process in a subframe which is given by said grant and shifted by the number of subframes indicated by the shift indicator.

\* \* \* \* \*

UNITED STATES PATENT AND TRADEMARK OFFICE
CERTIFICATE OF CORRECTION

PATENT NO. : 10,033,488 B2
APPLICATION NO. : 14/905752
DATED : July 24, 2018
INVENTOR(S) : Joachim Loehr et al.

Page 1 of 1

It is certified that error appears in the above-identified patent and that said Letters Patent is hereby corrected as shown below:

On the Title Page

Item (72) (Inventors):
"Joachim Loehr, Darmstadt (DE); Prateek Basu Mallick, Langen (DE); Alexander Golitschek Edler von Elbwart, Langen (DE); Michael Einhaus, Darmstadt (DE); Hidetoshi Suzuki, Kanagawa (JP)"
Should read:
--Joachim Loehr, Langen (DE); Prateek Basu Mallick, Langen (DE); Alexander Golitschek Edler von Elbwart, Darmstadt (DE); Michael Einhaus, Darmstadt (DE); Hidetoshi Suzuki, Kanagawa (JP)--.

Signed and Sealed this
Fifteenth Day of January, 2019

Andrei Iancu
*Director of the United States Patent and Trademark Office*